United States Patent

[11] 3,629,850

[72] Inventors William R. Clark Castro Valley; George H. Hare, Oakland; Peter E. Osborn, San Leandro, all of Calif.

[21] Appl. No. 596,920
[22] Filed Nov. 25, 1966
[45] Patented Dec. 21, 1971
[73] Assignee The Singer Company

[54] FLEXIBLE PROGRAMMING APPARATUS FOR ELECTRONIC COMPUTERS
16 Claims, 15 Drawing Figs.

[52] U.S. Cl. .......... 340/172.5
[51] Int. Cl. .......... G06f 9/06
[50] Field of Search .......... 340/172.5, 345; 235/157

[56] References Cited
UNITED STATES PATENTS

| | | | |
|---|---|---|---|
| 3,248,528 | 4/1966 | Campeau | 340/172.5 |
| 3,289,171 | 11/1966 | Scheer et al. | 340/172.5 |
| 3,289,174 | 11/1966 | Brown et al. | 340/172.5 |
| 3,344,404 | 9/1967 | Curewitz | 340/172.5 |
| 3,348,213 | 10/1967 | Evans | 340/172.5 |
| 3,351,917 | 11/1967 | Shimabukuro | 340/172.5 |
| 3,187,321 | 6/1965 | Kameny | 340/345 |
| 3,402,396 | 9/1968 | McBride | 340/172.5 |
| 3,411,142 | 11/1968 | Lee et al. | 340/172.5 |
| 3,181,123 | 2/1959 | Wright et al. | 340/172.5 |

OTHER REFERENCES

IBM 7040/7044 Customer Engineering Handbook, Pages 2- 5 and 80- 83, Form 223- 2640- 2, 1963, Poughkeepsie, New York- 12602.

*Primary Examiner*—Paul J. Henon
*Assistant Examiner*—Harvey E. Springborn
*Attorney*—Charles R. Lepchinsky

ABSTRACT: An electronic billing and accounting machine having a program memory means for loading one or more programs into the program memory, and means for requesting and identifying particular programs and causing execution of the particular programs once identified in the program memory.

*INVENTORS*
WILLIAM R. CLARK
GEORGE H. HARE
PETER E. OSBORN

BY Charles R. Lepchinsky
Patrick J. Schlesinger
*ATTORNEYS*

FIG. 5A

| Automatic Writing Machine Character Code 8 | 7 | 6 | 5 | 4 | 3 | 2 | 1 | Keyboard Character Identification | | 0 Address | 1 Address | 2 Address | Operation Description |
|---|---|---|---|---|---|---|---|---|---|---|---|---|---|
| | | 6 | | | | | | Ø | ) | | | | |
| | | | | | | | 1 | 1 | ! | X | | | |
| | | | | | | 2 | | 2 | @ | X | | | |
| | | | 5 | | | 2 | 1 | 3 | # | X | | | |
| | | | | | 3 | | | 4 | $ | X | | | |
| | | | 5 | | 3 | | 1 | 5 | = | X | | | |
| | | | 5 | | 3 | 2 | | 6 | ¢ | X | | | |
| | | | | | 3 | 2 | 1 | 7 | ? | X | | | |
| | | | | 4 | | | | 8 | * | X | | | |
| | | | 5 | 4 | | | 1 | 9 | ( | X | | | |
| | 7 | 6 | | | | | 1 | A | | | X | | Resume |
| | 7 | 6 | | | | 2 | | B | | X | | | Subtract |
| | 7 | 6 | 5 | | | 2 | 1 | C | | | X | | Positive Branch |
| | 7 | 6 | | | 3 | | | D | | X | | | Delete |
| | 7 | 6 | 5 | | 3 | | 1 | E | | | X | | Unconditional Branch |
| | 7 | 6 | 5 | | 3 | 2 | | F | | X | | | Add |
| | 7 | 6 | | | 3 | 2 | 1 | G | | | X | | Negative Branch |
| | 7 | 6 | | 4 | | | | H | | X | | | Seq. Sep. - Normal |
| | 7 | 6 | 5 | 4 | | | 1 | I | | | X | | Truncate |
| | 7 | | 5 | | | | 1 | J | | X | | | Constants Follow |
| | 7 | | 5 | | | 2 | | K | | X | | | Divide |
| | 7 | | | | | 2 | 1 | L | | X | | | Seq.Sep. - Translate |
| | 7 | | 5 | | 3 | | | M | | X | | | |
| | 7 | | | | 3 | | 1 | N | | X | | | Duplicate |
| | 7 | | | | 3 | 2 | | O | | X | | | Multiply |
| | 7 | | 5 | | 3 | 2 | 1 | P | | X | | | Print Sign |
| | 7 | | 5 | 4 | | | | Q | | X | | | Halt |
| | 7 | | | 4 | | | 1 | R | | X | | | Return |
| | | 6 | 5 | | | 2 | | S | | | | X | Store |
| | | 6 | | | | 2 | 1 | T | | | | X | Non-Decimal Print |

| | | | | | | | | | | | | |
|---|---|---|---|---|---|---|---|---|---|---|---|---|
| | | 6 | 5 | | 3 | | | U | | | X | |
| | | 6 | | | 3 | | 1 | V | | | X | Recall |
| | | 6 | | | 3 | 2 | | W | | | X | Accumulate |
| | | 6 | 5 | | 3 | 2 | 1 | X | | | X | Decimal Print Out |
| | | 6 | 5 | 4 | | | | Y | | | X | |
| | | 6 | | 4 | | | 1 | Z | | | X | |
| | | | 5 | | | | | Space | X | | | Terminate Constants |
| | 7 | | | | | | | - " | X | | | Change Sign |
| | | 6 | 5 | | | | 1 | / : | | | X | Enter |
| | 7 | 6 | 5 | | | | | & ; | X | | | |
| | 7 | | 5 | 4 | | 2 | 1 | % _ | X | | | |
| | | 6 | 5 | 4 | | 2 | 1 | , | X | | | |
| | 7 | 6 | | 4 | | 2 | 1 | . | | X | | Decimal Constant |
| | | | 5 | 4 | 3 | | | NP | X | | | F2 Flexo.Func. Non Print |
| | | 6 | | 4 | 3 | | | PR | X | | | F3 " Print Restore |
| | 7 | | | 4 | 3 | | | ON1 ON2 | X | | | F4 " Punch 1 ON |
| | 7 | 6 | 5 | 4 | 3 | | | UC | X | | | " Upper Case |
| | | | | 4 | | 2 | 1 | Stop | X | | | F1 " Readers Off |
| | | 6 | 5 | 4 | 3 | 2 | | Tab | X | | | " Tab |
| | | | | 4 | 3 | 2 | | SW | X | | | F9 " Switch |
| | | 6 | | 4 | 3 | 2 | 1 | Off | X | | | F6 " Punches Off |
| | | | 5 | 4 | 3 | 2 | 1 | DS | X | | | F10 " Data Select |
| | 7 | | | 4 | 3 | 2 | 1 | FF | X | | | F11 " Reader 1 On |
| | | | 5 | 4 | | 2 | | + ± | X | | | Carriage Return (Executed) |
| | 7 | | | 4 | | 2 | | ° , | X | | | Marker - Branch Routine |
| | | | | | | | | | | | | |
| | | 6 | | 4 | | 2 | | BS | X | | | |
| | | 6 | 5 | 4 | 3 | | 1 | | X | | | F13 Flex.Func. - Reader 2 On |
| | 7 | 6 | | 4 | 3 | | 1 | ½ ¼ | | X | | Type Out |
| | 7 | | 5 | 4 | 3 | | 1 | AID | X | | | F12 Flex.Func. - A.I.D. |
| | | | | 4 | 3 | | 1 | SR | X | | | F8 " Skip Restore |
| | 7 | 6 | 5 | 4 | | 2 | | LC | X | | | " Lower Case |
| | 7 | 6 | | 4 | 3 | 2 | | On 2 | X | | | F5 " Punch 2 On |
| | 7 | | 5 | 4 | 3 | 2 | | FC On | X | | | F7 " FC On |
| | 7 | 6 | 5 | 4 | 3 | 2 | 1 | Tape Feed | | X | | Load-Seperator Marker |
| 8 | | | | | | | | CR | | | | Carriage Return (Non-Executed) |

FIG. 5B

| | INPUT | OUTPUT |
|---|---|---|
| 001 | SEQUENCE | HA |
| 002 | ENTER QUANTITY | /30 |
| 003 | TAB TO PRICE FIELD | TAB |
| 004 | ENTER PRICE | /32 |
| 005 | TAB TO DESCRIPTION | TAB |
| 006 | HALT FOR DESCRIPTION | Q |
| 007 | TAB TO AMOUNT | TAB |
| 008 | MULTIPLY QUANTITY X PRICE | O |
| 009 | DECIMAL PRINT AMOUNT | X52 |
| 010 | STORE INVOICE TOTAL | S |
| 011 | CARRIAGE RETURN | CR |
| 012 | END SEQUENCE | |

FIG_10

FLEXIBLE PROGRAMMING APPARATUS FOR ELECTRONIC COMPUTERS

PRIOR ART

Various billing and accounting computers presently available are either fixed or flexible program machines.

The fixed program machine is generally automatic in operation but not adaptable to perform a variety of jobs or processes. Its use is limited to a business which performs a large volume of a particular process.

The flexible program machine, which is better adapted to meet the needs of a business with a wide variety of processes, has the disadvantage of generally not being automatic in operation. To change the program of the flexible program machine to perform a new process, the memory on which the program is retained must be changed or modified in some manner. Accordingly, a user may need to obtain and carefully maintain a large number of programmed memory devices, such as intricately wired program boards. As a rule, these changes or modifications of the memory are not readily accomplished.

The key to the evolution of an automatic, flexible programmed machine which is inexpensive is the development of a simple program control section including a simplified program memory unit which can retain a plurality of easily modified individual programs, each adapted to satisfy a different requirement, or process, of the user, thus eliminating the necessity of changing program memories when a new process is to be performed.

To keep the cost of such a program control unit low, presently used techniques cannot be employed. The program control section of known machines generally is comprised, in part, of a memory unit, or storage device, control logic, an instruction register, operational logic and an instruction counter. The storage device retains a program of instructions in identified locations or addresses. The control logic causes the machine to sequentially perform the instructions in the program by withdrawing the instructions one at a time from the storage device and inserting them into the instruction register. The operational logic decodes each instruction in the instruction register and causes a particular action to result for each decoded instruction. The instruction counter is the means by which the program control unit determines the address of the next instruction to be performed.

Several methods are presently employed to indicate the address of the next instruction. One method is to increment the instruction counter by a fixed amount upon the completion of each instruction. This method imposes rigid requirements upon the programmer, since he must position the sequential instructions in a routine at fixed intervals or positions within the storage device.

Another method for indicating the address of the next instruction to be performed is to assign to a particular portion of each instruction the function of designating the address of the next instruction. As each instruction is copied into the instruction register, the next instruction address portion of that instruction is simultaneously copied by the instruction counter.

This latter method, while allowing greater programmer flexibility in writing a program, results in a higher machine cost than the first method, since it requires greater storage device capacity for a given program. The simplification or elimination of any one or more of these parts would result in a substantial savings in the manufacture of a machine.

In addition to the original cost of a machine, a user of an automatic billing and accounting computer must consider the cost of obtaining new programs as his needs vary.

Some users employ a full-time programmer to perform this function. However, a small business cannot afford this and is, therefore, entirely dependent upon the computer manufacturer for this service. The time delay involved in sending to the manufacturer for a new program might exceed the period for which the program was required. Accordingly, if a simplified, inexpensive, flexible program control apparatus could also adapt itself to a technique for readily converting, or translating, to a complete program of instructions in the machine language from a list of functional words compiled by the user, reflecting the series of steps he desires to perform in a process, its utility would be greatly enhanced.

OBJECTS

Accordingly, an object of the present invention is to provide a flexible programming apparatus for electronic computers, such as a billing and accounting machine, which is inexpensive in cost and flexible in application.

Another object of the present invention is to provide a simplified program memory apparatus upon which one or more programs may be placed and by which an individual program may be accessed and performed upon request from the operator.

Yet another object of the present invention is to provide for establishing a reference within a program as it is being performed, by which a computer can determine which instruction shall be performed next, thus eliminating the need for an address within each instruction of a program, or the necessity of an instruction counter.

Another object of the present invention is to provide a simplified, inexpensive program control apparatus which can be adapted to accept a series of functional identifying words from an input device which identifying words describe a process and generate a corresponding program by means of an output apparatus, in machine language instructions, which will cause the machine to perform the desired process when the program is subsequently entered into the machine and executed.

SUMMARY OF THE INVENTION

In accordance with one aspect of the present invention, the program control section of an electronic digital computing machine is provided with a delay line memory through which one or more programs may be recirculated in the form of a serial data train of pulses. A timing reference which is associated with the delay line allows a series of pulses, or the absence of pulses comprising the data train, to be recognized as individual space time compartments called characters. Three temporary storage devices; a common register, a search register and an operation register, two of which are adapted to enable the serial train of space time compartment characters to recirculate therethrough in a predetermined manner, and the remaining register is adapted to have the characters copied therein. Each program sequence, which may include one or more instructions, in the serial train is separated from other programs by a first unique character called a sequence separator which precedes the series of instructions or characters comprising the program. Following each unique sequence separator is an identification character which identifies the individual programs. An input device coupled to the program control section may be used to select a particular program to be performed by requesting that program by its particular identification character. The program request character identifying the requested program is entered from the input device and is temporarily stored in the common register, as each sequence separator is recognized, while the contents of the program data train is recirculating, the stored program request character is compared with the particular program identification character following the sequence separators, with agreement indicating that the desired program has been found.

In accordance with another aspect of the present invention, means is provided for causing each character, or instruction, within a selected program to be sequentially, nondestructively copied, from the recirculating data train by the operation register for execution by the computer. A second unique marker called the instruction marker, is inserted into the program data train between the instruction copied into the operation register and the next-occurring instruction. This is accomplished, as described in detail hereinbelow, by delaying the time the remainder of the data train is entered onto the delay line by one character time. After each instruction is executed, the machine will search the data train for the instruction marker. When the marker is recognized, the instruction following it is copied by the operation register and the instruction marker is repositioned into the character space following that character on the data train such that it occupies the time space which formerly held the following instruction before it was copied into the operation register and the following instruction occupies the time space which formerly held the instruction marker before the following instruction was copied. In other words, the instruction marker and the following instruction exchange character spaces on the serial data train. As is now apparent, once inserted into the data train, the instruction marker progresses through the sequence of program instructions until the entire program selected is executed. As will now be apparent, the total delay of the delay line memory must be at least equal to the time of the maximum data train plus the instruction marker (one character time). As described below, the present invention utilizes a delay line having a delay time greater than this to provide an unused delay time between the end of the data train and the beginning of the data train which is called the "home" period;

In accordance with another aspect of the present invention, means for readily creating new programs is provided by logic which will recognize that each program, or instruction, on the delay line is identified by three identification characters following each sequence separator instead of the normal single identification character. The machine accepts the first three characters of a word inserted by the input device, placing them into the operation register, the search register and the common register in the order of entry. As each sequence separator is recognized, these three characters are sequentially compared with the three identification characters following the sequence separator. If one of the programs on the delay line are identified by a series of characters corresponding to those entered, the machine will accept the first two characters of a second word inserted by the input device, placing them into the search register and the common register, respectively, retaining the first character of the first word in the operation register. Another search of the data train is initiated. If, again, no program is identified by these characters, the machine will accept the first character of a third word inserted, placing it into the common register, retaining the first character of the first word in the operation register and the first character of the second word in the search register. A third search of the delay line is initiated. If no program is found, which is identified by these three characters, the machine will cause the three registers to be set to zeros and a fourth search is made for an error program which is identified by these three blank characters. Once found, the program, or instruction, is punched into a tape in machine language form. In this manner, new programs comprising a plurality of such instructions or programs in a predetermined sequence can readily be obtained on punched tape, the contents of which may then be placed onto the program storage device, such as a delay line, after first clearing the programs and instructions used to generate the new program from the delay line.

In accordance with another aspect of the present invention, the instructions which are placed upon the delay line comprise either one, two, or three characters. The single character instruction, when copied from the delay line by the operation register, determines a complete logical function. The multiple character instruction has a dominant character, which is copied by the operation register, and one or two additional characters, which are passive in nature, and are copied by the search register from the delay line. A complete logical function is determined by the combination of these three characters.

In accordance with another aspect of the present invention, a flexible programming apparatus is provided which may branch unconditionally from one program to another, or secondary program, when instructed to do so by an instruction within a particular program. Upon completion of the secondary program of instructions, the computer will return to the instruction following the unconditional branch instruction in the original program.

In accordance with another aspect of the present invention, a computer is provided which may branch conditionally from an instruction within a particular program to another particular instruction which may be contained in the particular program or may be in a secondary, or another, program.

This invention, as well as other features, objects and advantages thereof, will be readily apparent from consideration of the following detailed description relating to the accompanying drawings in which like reference characters designate like, or corresponding, parts throughout the several views, and wherein:

BRIEF DESCRIPTION OF THE DRAWINGS

FIG. 5A and 5B illustrates the automatic writing machine code for the instruction characters used in the present invention;

FIG. 7 is a pictorial view of the keyboard of the automatic writing machine;

FIG. 10 is an English language word description of FIG. 9; and

GENERAL DESCRIPTION

1. Console and Automatic Writing Machine

Figure 1:
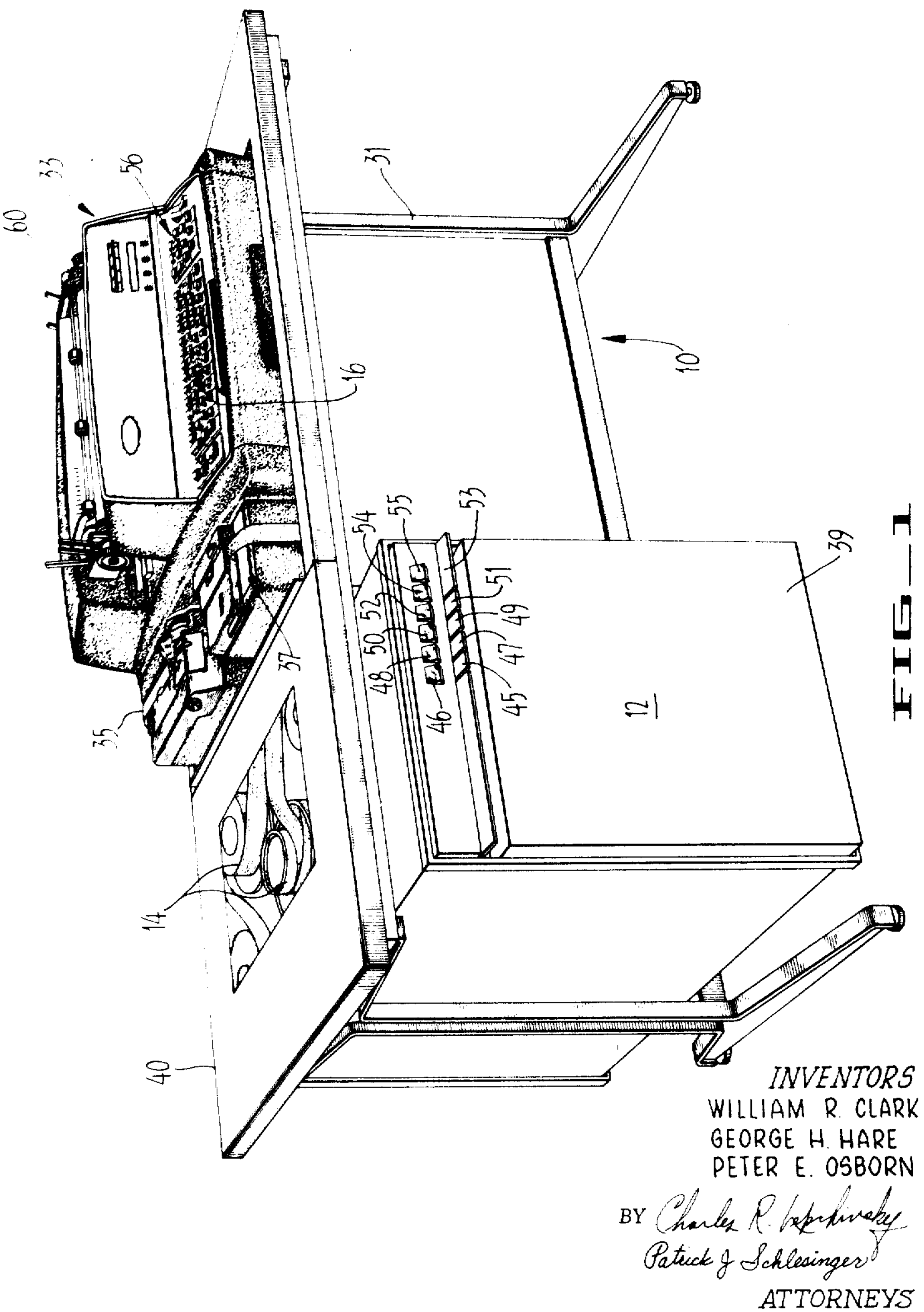
FIG. 1 is a pictorial view of an electronic digital computer embodying a preferred form of this invention.

Referring now to FIG. 1, which illustrates a pictorial view of an electronic digital computer 10 embodying a preferred form of the present invention, there is illustrated a console desk 31.

The upper right-hand portion of the desk 31 is adapted to receive an automatic writing machine 33, such as Friden Flexowriter Model 2205 which has been successfully used in the practice of the present invention. The writing machine 33 is provided with a tape punch 35 and a tape reader 37. The left-hand portion of the table top is provided with a sliding section 40 which is adapted to move laterally to the left. Beneath the table top 40 is a housing unit 39, which contains an electronic processor 12 which includes various electronic circuits that accomplish the objects of this invention when used in conjunction with the writing machine 33, and the tape reader and tape punch 37 and 35.

Also contained within the housing 39 are tape reels 14 which cooperate with the electronic processor 12 for a purpose which will be hereinafter set forth more fully.

On the upper front portion of the housing 39 are five control switches 45, 47, 49, 51 and 53 and six indicator lights 46, 48, 50, 52, 54 and 55 used to establish and indicate, respectively, the various modes of operation of the apparatus 10.

An "on/off" switch 53, with its indicating light 54, when depressed, will cause electric power to be supplied to the electronic processor portion 12. A second depression of the switch 53 will turn the electric power off. When the electric power is first turned on, the machine 10 will automatically be placed in a "load" condition indicated by a load light 46 during which time program information may be entered into a program storage device.

A load switch 45 controls the duration of the load condition. Depression of the load switch 45 after loading a program into a program storage device will terminate the load condition and the load light 46 will be turned off. Subsequent depression of the load switch 45 will reestablish the load condition, permitting another program, or programs, to be entered on a destructive basis into the program storage from tape reader 37 or keyboard 16 of writing machine 33 depending upon which one has been previously selected from a control panel 56 on the automatic writing machine 33, as seen in FIGS. 1 and 7.

A "translate" switch 47, when depressed, will turn on the translate light 48 and will place the apparatus 10 in a translate mode, thereby allowing the translation of program requirements into apparatus machine language, as hereinafter described, in a rapid and economical manner. A second depression of the translate switch 47 will cause the translate mode to be terminated and the machine 10 to be restored to a normal operate mode which is controlled by the on/off switch 53.

A "reset" light 50 will be lit whenever an internal transfer of data results in the sensing of an error condition. Depression of a reset switch 49 will clear the error condition and also terminate the program sequence being executed, thereby extinguishing the reset light 50. Depression of the reset switch 49 when the error reset light 50 is not lit terminates the program sequence.

A "type-only" switch 51, when depressed, will turn on the "type-only" light 52 and place the apparatus 10 in a type-only condition. In the type-only condition, the writing machine 33 and its auxiliary input/output devices such as the tape reader 37 and the tape punch 35 will operate as a normal automatic writing machine system with no logical connection to the electronic computing apparatus 12. A second depression of the type-only switch 51 terminates the type-only condition.

A program sequence light 55 will be turned on when the computing apparatus is not in a program sequence and will be turned off during the period in which the computer 10 is actually performing a program sequence.

The writing machine 33 provides an online capability for the input/output of data. Data may be entered manually into the computing apparatus from the keyboard 16 of the writing machine 33 or semiautomatically from the tape reader 37. The tape punch 37 may also reproduce data at the same time as the writing machine 33 is printing data, either under manual control from an operator or automatically in response to control commands from the computing apparatus 12.

Figure 2:
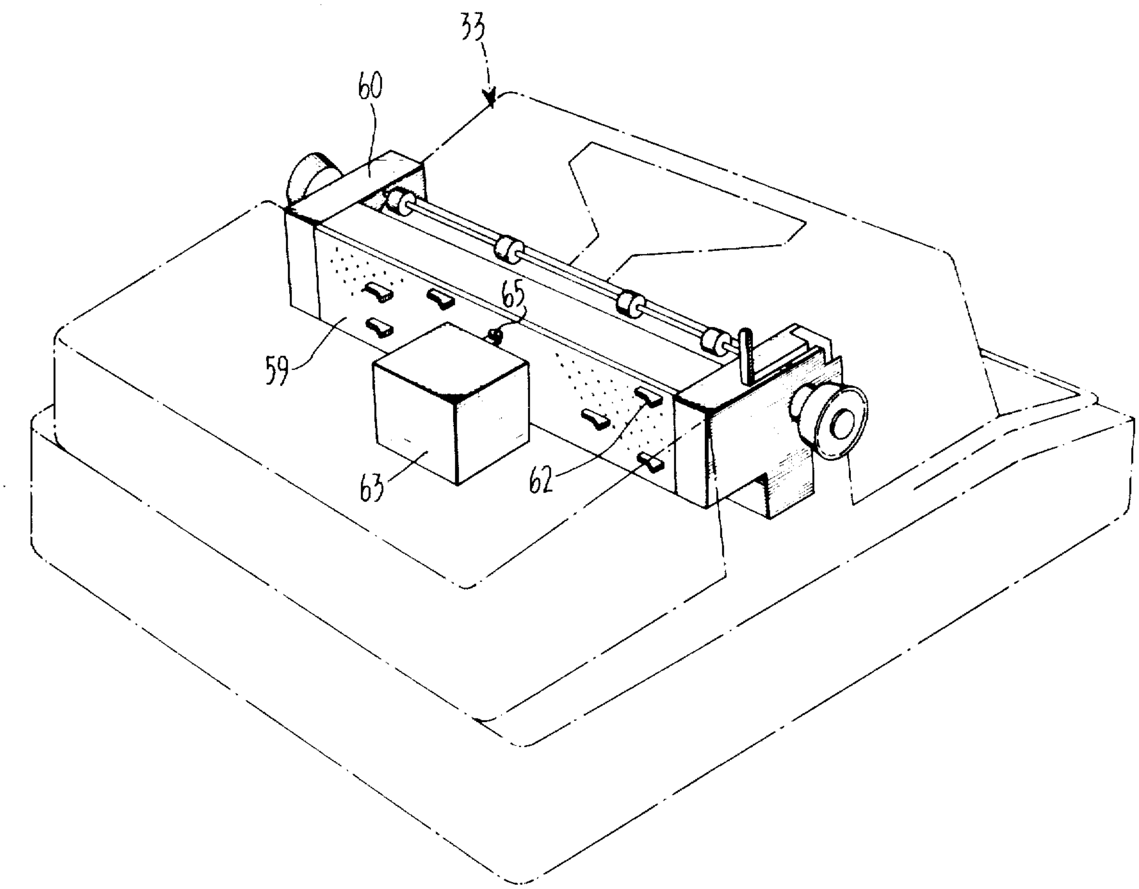
FIG. 2 illustrates a breakaway view of the rear of the automatic typing assembly shown in FIG. 1.

Referring now to FIG. 2, there is shown a breakaway rear view of the writing machine 33, exposing the rear portion of a movable carriage 60. A substantially flat rectangular actuator rack 59 is removably secured to the back of the carriage 60 of the writing machine 33, such that the longitudinal axis of the actuator rack 59 is parallel to the longitudinal axis of the carriage 60. Actuator cams 62 are of removably secured to the rack 59 in predetermined positions and in a suitable manner which is well known in the art.

Secured to the base of the writing machine 33 is a field switch housing 63 which contains a plurality of field switches 65 (only one of which is seen in FIG. 2). Each field switch 65 contained in the housing 63 is arranged to be actuated by the cams 62. Lateral movement of the carriage 60 will cause the cams 62 carried by the actuator rack 59 to traverse in front of associated field switches 65. A cam 62 when operatively contacted by a field switch 65 will result in an electrical signal being generated, which signal is sensed by the computing apparatus 10 and is used to indicate the position of the carriage 60.

Figures 4A, 4D:
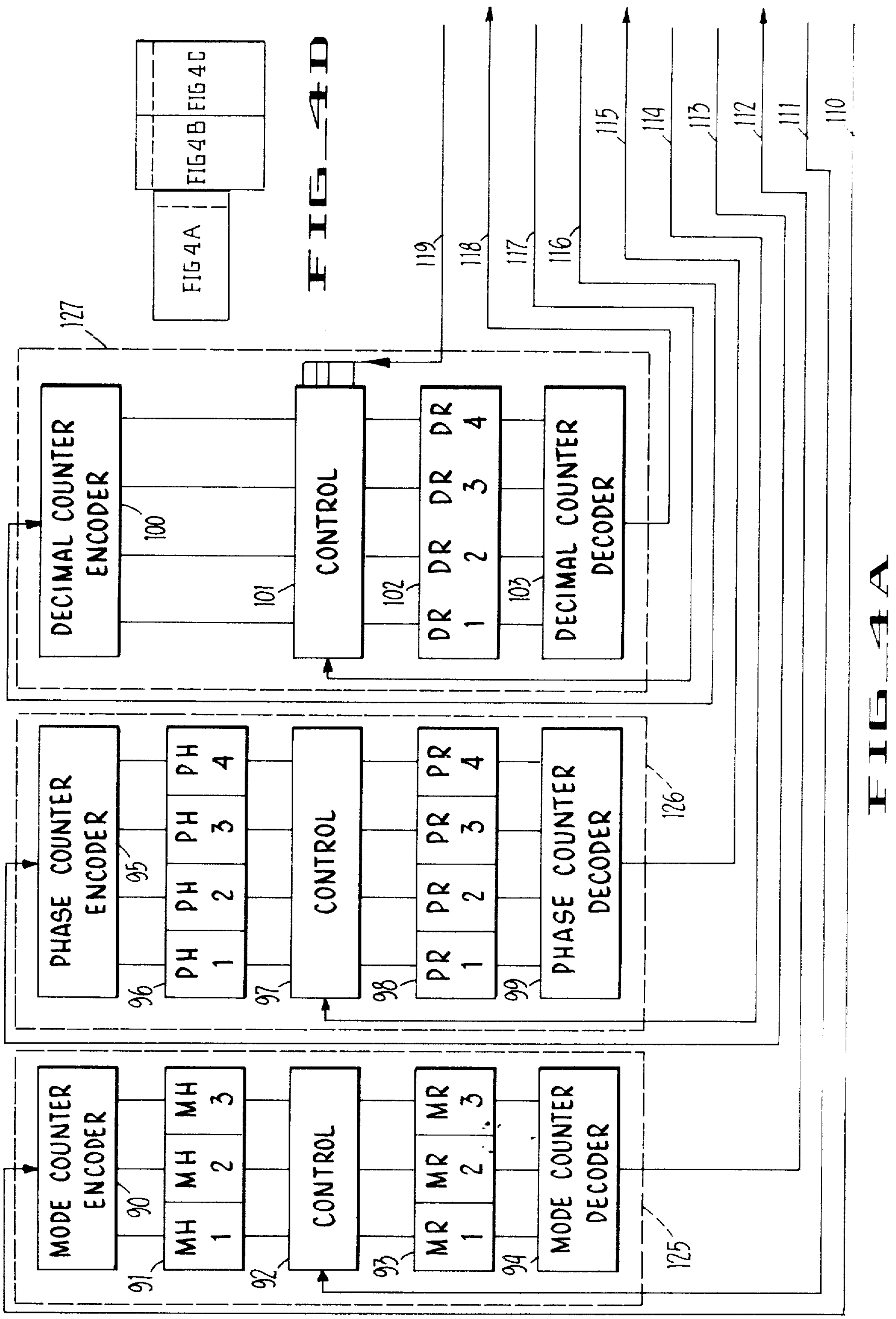
FIGS. 4A, 4B and 4C, assembled according to FIG. 4D, illustrates a simplified system block diagram of the present invention.
Figure 4B:
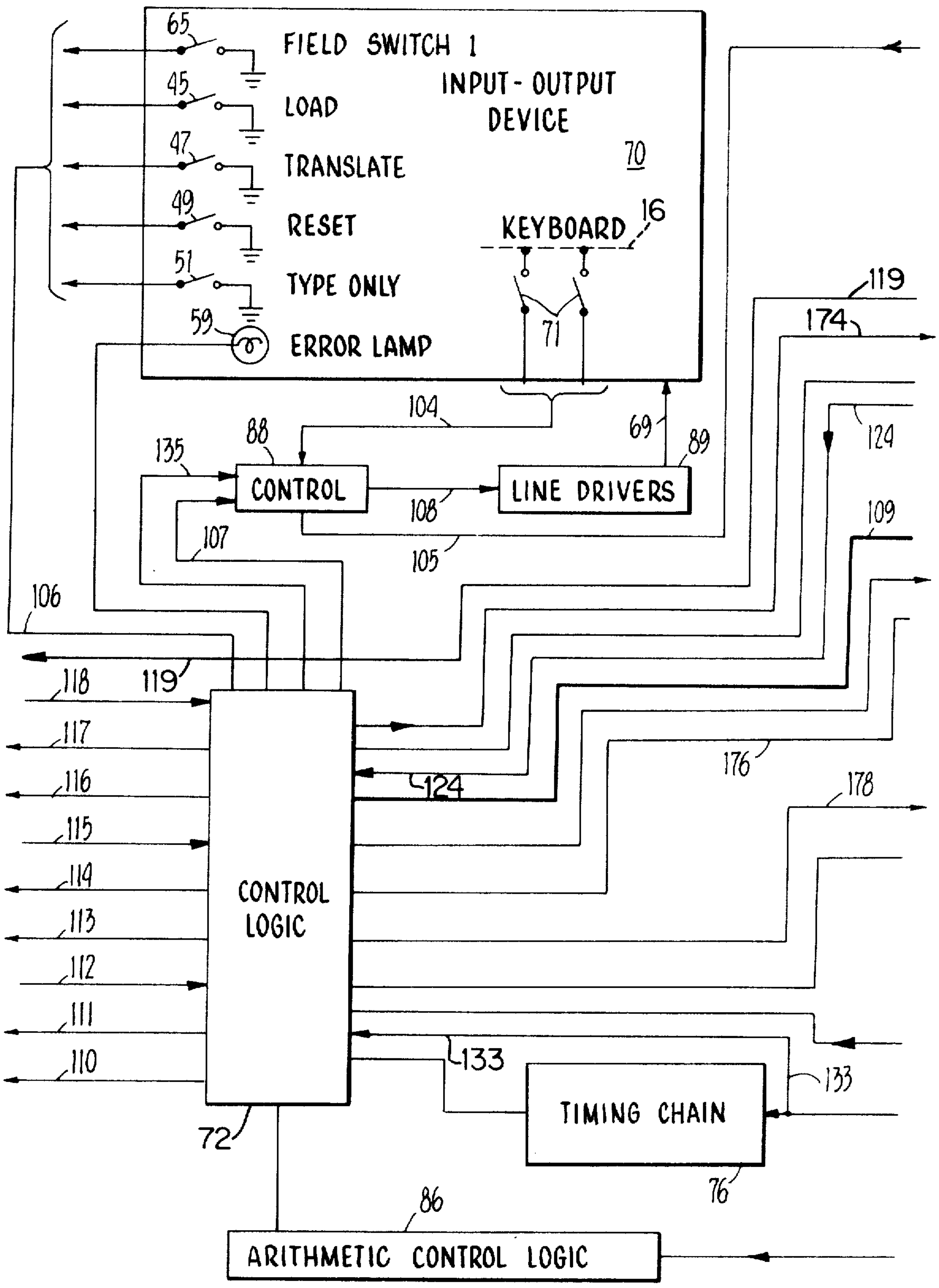
Figure 4C:
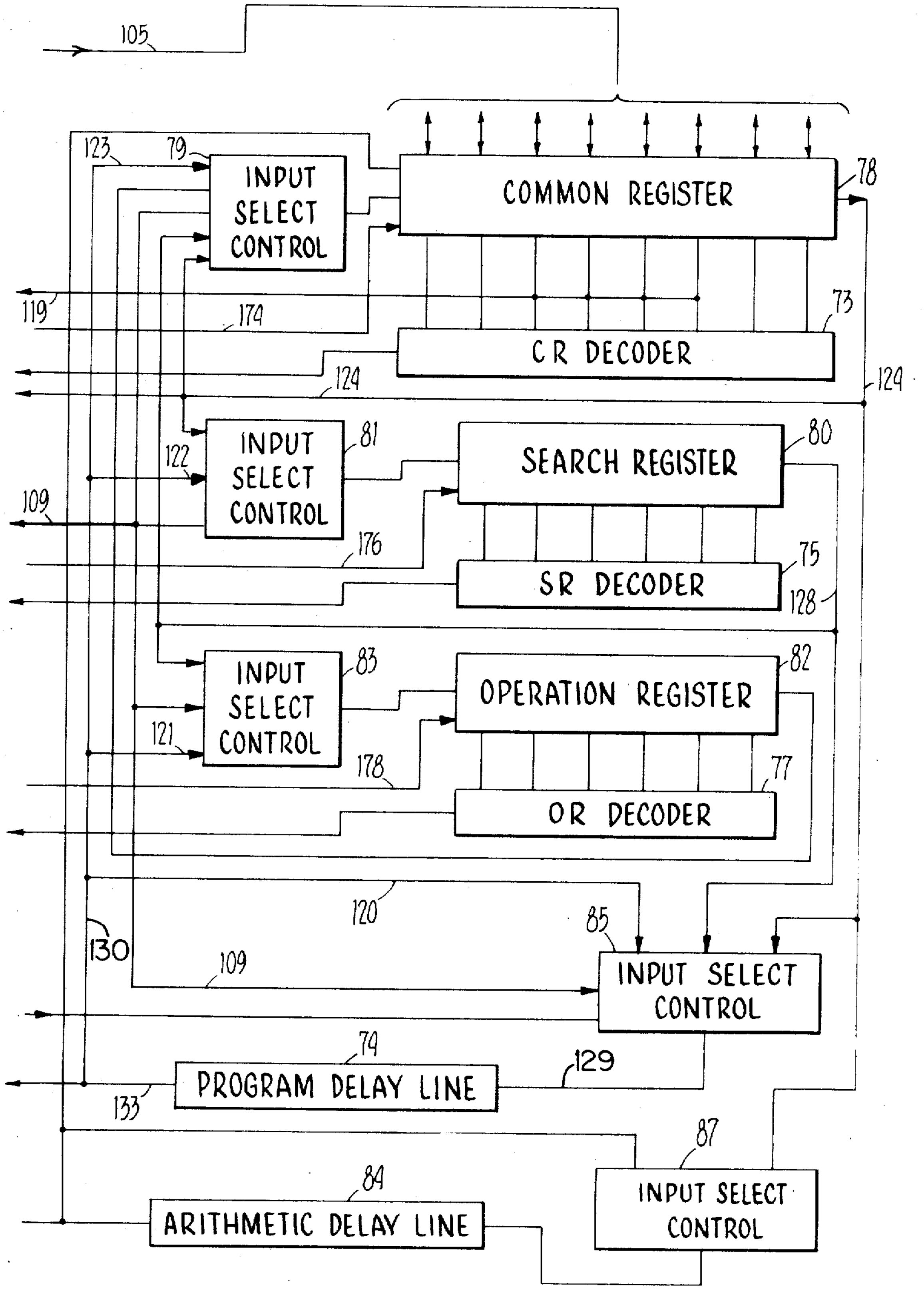

Briefly described, the operation of the apparatus 10 illustrated in FIG. 1 provides, in the load mode of operation, for one or more programs to be loaded, or stored, in a program data train in the electronic portion 12, such as a recirculating loop which includes an acoustic delay line 74 (FIG. 4C). The program or programs are entered or loaded onto the delay line 74 by way of the keyboard 16 or by way of the tape reader 37. After performing the loading operation, the proper billing/accounting form, invoice, or payroll record, etc., is entered into the writing machine 33. The completion of the form used may require either a single program or a plurality of programs. The program required is obtained by the operator by depressing a key on the keyboard 16 that identifies the desired program. The apparatus 10 then enters the search mode of operation, during which time the electronic portion 12 searches the program data train for the desired program. After the required program is found, the apparatus executes each of the separate instructions comprising the desired program. These separate instructions may enable the operator to type descriptive material on the form being used, enter quantity and price information, or cause the electronic arithmetic portion to calculate total prices, taxes, and the like, actuate the tape reader and punch, etc.

As described above, the separate instructions comprising the desired program may be entered into the program storage device in the desired sequence by way of the keyboard 16 or from a previously punched program tape by the tape reader 37. The punched tapes, containing programs, may be supplied by the manufacturer or they may be readily prepared by the user of the apparatus 10. This is accomplished by the use of a punched translate tape which contains all of the instructions which can be performed by the apparatus 10. The contents of the translate tape are placed into the program storage device by the tape reader 37 when the apparatus is in the load mode of operation, thereby forming a translate program data train. In the translate mode of operation, any number of required program tapes can be readily generated. This is accomplished by the user determining the sequence of functions necessary for the new program or programs. Each function, which may comprise a plurality of instructions, is identified by no more than three descriptive and identifying English language words.

The user generates a program tape by merely typing the descriptive words associated with each desired function by means of the keyboard 16. As the descriptive words are entered via the keyboard 16, a single instruction or a search is made for that particular function as defined by a sequence of instructions on the translate program data train. When found, the instructions required to perform the desired function are punched on a tape in machine language form by the tape punch 35. After the proper sequence of instructions have been punched on the new program tape, the translate program data train can be cleared from the program storage device and the contents (one or more programs) of the new program tape can be entered upon the program storage device as a new program data train by means of the tape reader 37, after which one or more of the new programs may be selected as described above. Each new program generated in this manner is identified in a suitable manner, such as by the character symbols "A," "B," "C," etc., appearing on the keyboard 16 (see FIG. 5A, 5B). The identifying character of each program sequence is punched onto the tape prior to the instructions thereof by means of the keyboard 16.

It is not necessary to use English language descriptive words, as described above, when generating new programs in the translate mode.

The program control apparatus of this invention which enables the above features and functions to be readily and economically achieved will be described hereinbelow in detail.

2. System Block Diagram a. General

Referring now to FIGS. 4A, 4B and 4C, (interconnected as shown in FIG. 4D), there is shown a system block diagram embodying the present invention. The system may be broken down into three main areas or sections. The first is the input-output section in FIG. 4B which includes an input-output device 70, comprising the writing machine 33 and the tape reader 35 and punch 37, control element 88 and line drivers 89. The second area is the arithmetic section shown in FIGS. 4B and 4C which includes arithmetic delay line 84, input select control element 87, and arithmetic control logic 86. The balance of the system diagram in FIGS. 4A, 4B and 4C is the third area and will be referred to as the program control section.

The program control section, which is set out in more detail than the other sections, includes a program delay line 74 with its input select control 85, a timing chain 76, a common register 78 with its associated input select control 79 and decoder 73, a search register 80 with its associated input select control 81 and decoder 75, an operation register 82 with its input select control 83 and decoder 77, control logic 72 and three counter units; a mode counter unit 125, a phase counter unit 126 and a decimal counter unit 127.

The mode counter unit 125 includes a mode counter encoder 90, a "Mode Hold" or MH counter 91, a control element 92, a "Mode Register" or "MR" counter 93 and a mode counter decoder 94.

The phase counter unit 126 comprises a phase counter encoder 95, a "Phase Hold" or "PH" counter 96, a control element 97, a "Phase Register" or "PR" counter 98 and a phase counter decoder 99.

The decimal counter unit 127 includes decimal counter encoder 100, a control element 101, a "Decimal Register" or "DR" counter 102 and a decimal counter decoder 103.

The delay line 74 may comprise any suitable acoustic delay line such as that disclosed in U.S. Pat. No. 3,011,136 issued Nov. 28, 1961 and having Ser. No. 836,844.

Implementation of a suitable timing chain 76 is well known in the art as shown by Chapter 7, pages 174–208 of the textbook entitled "Logical Design of Digital Computers" by Montgomery Phiester, Jr., copyright 1958 by John Wiley and Sons, Inc., Library of Congress Catalog Card No. 58–6082.

Implementation of suitable control logic 72, i.e., switching circuitry, is well known in the art as is shown by Chapter 3 entitled Switching Networks, pages 51–80 of the textbook "Arithmetic Operations in Digital Computers" by R. K. Richards, copyright 1955 by D. Van Nostrand Company Inc., Library of Congress Catalog Card No. 55–6234. The function and general operation of the control logic will be apparent from the following description.

The function and general operation of the registers 78, 80, and 82 described above will be apparent from the following description and may comprise any suitable register well known in art. That registers are well known is shown by the textbook "Digital Computer Principles" by the Technical Training Department of the Burroughs Corporation, on pages 308–322, copyright 1962, McGraw-Hill Book Company Inc., Library of Congress Catalog Card No. 62–13207; and the textbook "Digital Computer Primer" by Edward Mark McCormick, on pages 80–81, 74, and 95, copyright 1959 by McGraw-Hill Book Company Inc., Library of Congress Catalog Card No. 58–13011.

The function and general operation of the various counters described above will be apparent from the following description and may comprise any suitable counter well known in the art. That counters are well known is shown by pages 80, 74, 141, 146, 142, 74 and 78 of the text "Digital Computer Primer" described above and by Chapter 16, pages 291–306 of the text "Digital Computer Principles" described above.

The function and general operation of the various decoders associated with the registers and counters will be apparent from the following description and comprise any suitable decoder such as a diode matrix decoder. That decoders are well known in the art is shown by Chapter 16 of the text "-Digital Computer Principles" described above and by pages 81–82 of the text "Digital Computer Primer" described above.

The input/output device 70 of FIG. 4B provides the communications medium between an operator and the machine. The "load" switch 45, the "translate" switch 47, the "reset" switch 49 and the "type-only" switch 51 are control switches which allow the operator to select the mode of operation of the machine, as previously set forth. A depression of one of these switches will generate a signal which is transmitted to the control section 72 by way of a cable 106, which represents a plurality of leads, each corresponding to a particular switch.

Data inputs to the machine are generated by input means characterized in the diagram by keyboard switches 71. These switches 71 are only representative of a plurality of switches on the keyboard 16 (FIG. 1) of the automatic writing machine 33. Alternative data input means, such as the tape reader 37 shown in FIG. 1, may also be used if desired.

When the operator desires to enter a particular data or code character into the machine 10 (FIG. 1), he depresses the proper key on the keyboard 16 which closes predetermined keyboard switches 71 in a particular pattern corresponding to the key selected. Signals generated from the switches 71 or tape reader 37 are transmitted to the control element 88 by cable 104. Control element 88 contains a plurality of gates (not shown) which, when enabled by control logic 72, will allow the input signals to pass through to the common register 78 on cable 105. The gates are enabled by an enable signal appearing on the line 107 for data into the common register 78. Data outputs from the machine 10 originate in the common register 78 and drive the line drivers 89 when data signals on cable 105 are allowed to pass through control element 88 to cable 108. The gates in element 88 are enabled by the control logic 72 by way of line 135 for data out from the common register. The line driver signals on cable 69 activate various conventional output means in the input/output device 70, such as tape punch 35, or the automatic writing machine 33.

The data characters which are communicated between the input/output device 70 and the program control section comprise eight parallel bits. After each character is entered and parity checked, however, the machine will retain only six of the eight input bits.

The sequence of characters comprising programs for the machine are placed on the program delay line 74 (FIG. 4C) serially from the keyboard 16 or from the tape reader 37. The data train of characters on the program delay line 74 is recirculated by one of several possible routes. The program delay line data train may recirculate directly by way of lines 133, 130, 120, input select control and line 129, or the recirculation path may include one of the temporary storage devices capable of retaining one full six-bit character, i.e., the common register 78 by lines 123 and 124, or the search register 80 by lines 122 and 128. Although the operation register 82 has the ability to copy characters emerging from the program delay line 74 on line 121, there is no provision for recirculating the program data train through this register.

The bits of each character emerging from the program delay line 74 are continuously sensed by the input select control elements 85, 79, 81 and 83 and control logic 72 determines which input select control element 79, 81 or 83 will be enabled to allow characters to pass through. Enabling is achieved with a signal on one of the lines in cable 109, which represents individual leads between the various input select control elements and the control logic 72.

The temporary storage devices 78, 80 and 82 may transfer data to one another by an interregister transfer operation. For example, a character contained in the common register 78 may be transferred on line 124 to input select control 81 and into the search register 80. In a like manner, the contents of the search register 80 may be transferred to the operation register 82 and from the operation register 82 or the search register 80 to the common register 78. To accomplish this, the control logic 72 enables the correct select control 79, 81, or 83 input to the respective registers 78, 80, or 82 and applies a shift pulse to both registers. The control logic 72 applies a shift pulse to the common register 78 on line 174, to the search register 80 on line 176 and to the operation register 82 on line 178.

As previously stated concerning the recirculation of data through the program delay line 74, the outputs of these various registers are being constantly sensed by the input select control elements 79, 81 and 83 to which they are connected. The transfer from one register to another depends entirely upon which gate in which input select control element has been enabled by the control logic 72.

The timing chain 76 (FIG. 4B) provides a reference signal allowing the program control section to synchronize logical action. The timing chain 76 cycles through a sequence of six counts, each count corresponding to one bit in each character emerging from the delay line 74 with each bit containing four phases. When the timing chain 76 has assumed a terminal condition or count representing the sixth bit in a character, the control logic 72 recognizes that a complete character has just emerged from the delay line 74 and directs any particular action that may be necessary.

The mode counter unit 125 (FIG. 4A) is the means by which the mode of operation of the machine is determined. Signals which indicate a particular configuration or count of the MR counter 93 are transmitted from mode counter decoder 94 to the control logic 72 on cable 112. These signals, when sensed by the control logic 72, will result in a predetermined sequence of actions by the control logic 72. To change the mode counter unit 125 from one count to another, a signal from the control logic 72 is sent to the mode counter encoder 90 on cable 110. The encoder 90 generates a plurality of signals which are sent to the MH counter 91, causing it to assume a particular count corresponding to the signal received on cable 110. The count in the MH counter 91 is set into the MR counter 93 whenever the gates in the control element 92 are enabled by line 111 from the control logic 72.

The phase counter unit 126 provides a submode control for the program control section.

The phase counter decoder 99 decodes the configuration or count of the counter 98 and transmits a signal to the control logic 72 on cable 115. The PR counter 98, unlike the MR counter 93, is interconnected as a binary counter and will be stepped to another count whenever the control element 97 receives on line 114 a signal enabling it to do so, which signal originates in the control logic 72. When the control logic 72 directs the PR counter 98 to advance to a count which it would not normally assume, it will send a "jump signal" on cable 113 to the phase counter encoder 95. The encoder 95 generates a plurality of signals which, when gated into the PH counter 96, will cause the PH counter 96 to assume a particular count corresponding to the signal received on cable 113. The count in PH counter 96 is gated into the PR counter 98 when control element 97 is enabled by a signal from control logic 72 on line 114.

The decimal counter unit 127 provides an additional means for submode control in the program control section. The configuration on count of the DR counter 102 is decoded by the decimal counter decoder 103 and signals corresponding to a particular count in the DR counter 102 are sent to the control logic 72 on cable 118. The DR counter 102 will progress from one count to a predetermined subsequent count upon command from the logic 72 on line 117. To change the DR counter 102 to a count which it normally would not assume in the predetermined sequence of counts, the control logic 72 will generate a "jump signal" on cable 116. The decimal counter encoder 100 will generate a plurality of signals corresponding to the count received on cable 116. These signals, when gated into the DR counter 102, will cause the DR counter 102 to assume the desired count when the control logic 72 enables the control element 101 with a signal on line 117.

b. Timing

Figure 3:
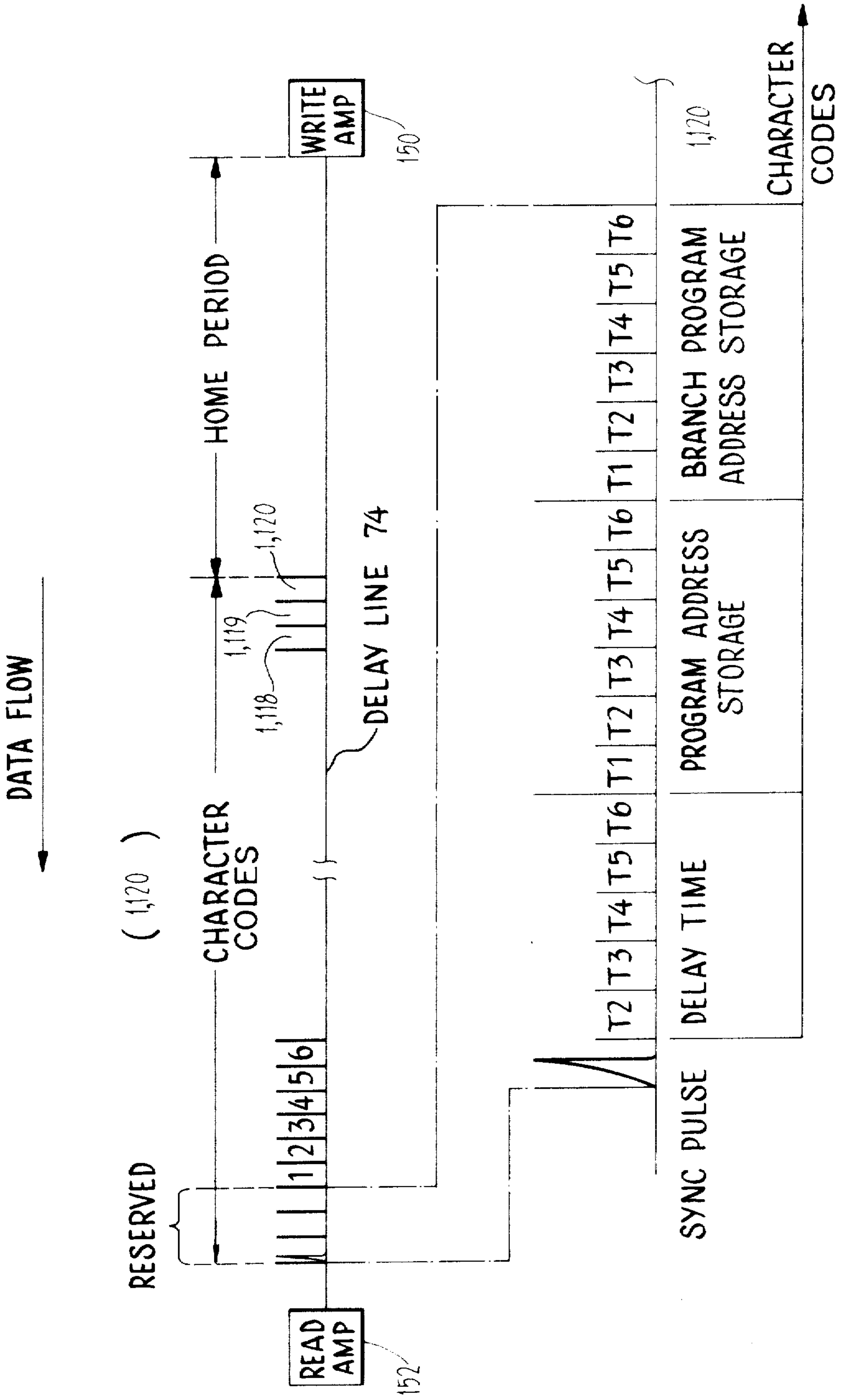
FIG. 3 illustrates the organization of program data on the program storage device portion of the present invention.

Referring now to FIG. 3, there is shown the organization of characters on the program data train. The program delay line 74 has a time delay greater than the time period of a data train which includes 1120 characters, each character consisting of six bits of information. These six bits provide 64 possible character representations. The characters are placed serially on the program delay line 74 and are recirculated. A suitable write amplifier 150 receives electrical signals from the machine and generates an impulse which is placed on the magnetostrictive delay line 74. The impulse travels down the delay line and is reconverted to an electrical signal by a suitable read amplifier 152. The time required for the impulse to travel from the write amplifier 150 to the read amplifier 152 is the delay time of the delay line 74, which, in one embodiment of the invention, is 10 milliseconds. The delay time of the delay line 74 is determined by its length and the material from which it is constructed.

The characters are placed or launched serially upon the program delay line 74 and are recirculated in a loop either through the registers as previously discussed, or directly back onto the delay line 74.

A pulse termed the "synchronization" or "SYNC" occupies the first bit position of the first six-bit character space on first pulse within first pulse within the data signal train and indicates when read out of the delay line, that the leading bit of the data signal train placed on the line has emerged from the delay line 74. Following the SYNC pulse is an unused five-bit time delay time and two six-bit character spaces which are not used for the storage of normal program instruction characters. The function of these spaces will be discussed hereinafter.

Each character space of the program data train following these initial three character spaces is available for storage of program instructions, identification characters, sequence separators and the like. The 1120 character capacity of the program data train is less than the total character storage provided by the 10 millisecond time delay of the program delay line 74. The extra or vacant period of time, which is at least several character time periods long, is unused, and is termed a "home" period, as shown in FIG. 3. The home period is necessary to enable the machine 10 to recognize that the end of the program data train has been reached. The SYNC pulse at the program front of the data train is recognized only because the machine 10 knows that it is the first pulse to appear, following the home period. The home period on the delay line 74 will vary, depending upon the actual number of characters within the program data train 74 but is never less than the difference between the time delay of the delay line and the maximum program data train (1120 characters) plus an instruction marker (one character).

The characters stored on the program delay line 74 may be separated into program segments. The program delay line might contain one entire program, or any number of smaller programs. Each program is separated from the preceding program on the program delay line by a unique or special code termed a "sequence separator." The code for the sequence separator in one embodiment of the present invention is shown in FIG. 5A as the automatic writing machine character code associated with the letter "H." This program sequence separator is followed immediately by an "identification character" which indicates the identity of the program comprised of the following instructions appearing in the program data train before the next sequence separator.

The execution of a desired program is initiated by the operator's indicating to the machine 10 the identification character for the desired program. The machine 10 first searches the program data train, commencing at the front with the SYNC pulse, character-by-character looking for a sequence separator. As each sequence separator is recognized, the machine 10 examines the following identification character and compares it with the operator initiated program request character representing the desired program. When the comparison indicates that the correct program has been located, the machine 10 will sequentially withdraw instructions from that program so that all the instructions in a program will be performed sequentially.

c. Instruction Characters

The program instructions utilized in the present invention are comprised of six bits allowing 64 distinct instructions. These instructions, as well as their assigned instruction representing characters and functions, are shown in the chart of FIG. 5A, 5B. The instruction character code representations are shown in the left-hand columns of the chart as they would appear on an eight-channel punched tape when a particular key, shown in the center column of FIG. 5A, 5B of the keyboard 16 is selected. The fifth and eighth code channels in the character columns are not of logical significance to (i.e., not utilized in) the internal operation of the machine 10. A code bit is present in the number five-code channel whenever an instruction is selected which has an even number of bits and no bit is present when a character is represented by an odd number of bits. Accordingly, every character code has an odd number of bits. This is the well-known odd parity code configuration.

Once an instruction-representing character code has been entered into the machine and initially checked for the correct parity, the parity bit of code channel five is disregarded. The number eight channel is utilized to represent, on punched paper tape, a carriage return that was performed during preparation of the tape; this code, when received by the machine 10, does not execute a carriage return but is changed internally to a different configuration for use within the machine 10. The subdivided instructions of FIG. 5A, 5B may be subdivided into several categories with each program instruction character belonging to one or more categories.

A first category comprises program instruction characters which are recognized by the machine's logic as constituting a complete independently executable program instruction.

Another category comprises program instruction characters which are not independent executable instructions but which require one or two additional program instruction characters to define a completely executable program instruction. Those program instruction characters which require one additional program instruction character to be complete will hereinafter be referred to as "single address instructions" and those requiring two will be referred to as "double address instructions." The single and double address instructions collectively constitute the "addressable instruction" category.

An addressable instruction on the program delay line 74 comprises a dominant instruction representing character and one or two address instruction representing characters occupying a position following the dominant instruction representing character.

Arithmetic instructions, which comprises both addressing and nonaddressing instructions that direct the control section of the machine 10 to command the arithmetic section to perform some arithmetic operation, such as add, subtract, multiply or divide.

Another category of instructions is the "program control section" instructions, when executed, will cause the control logic to enable a particular function. Representative of this category of instructions are the positive branch, negative branch, conditional branch and resume program instructions.

Another category of instructions is the "flexofunction" instructions. These instructions, when executed, command the automatic writing machine 33 to perform a particular act, such as carriage return, tab, space, etc. A subcategory of this group are the "special flexofunction" instructions which will cause the input/output device 70 to activate or deactivate a particular input or output means, such as the tape reader 37 and tape punch 35.

Of special significance is the typeout instruction corresponding to the "½/¼" character key of the writing machine 33. It will be noted from FIG. 5A, 5B that the typeout instruction is a single address instruction.

When the control section receives the typeout instruction character, the control logic 72 (FIG. 4B) will recognize this instruction as requiring one additional instruction character to define a complete executable program instruction. The typeout instruction character code indicates to the control logic 72 that the writing machine 33 or other output means in the input/output device 70 is to receive an alpha-numeric character to be typed out, or punched, as the case may be. The particular alpha-numeric character to be received by the output means in the input/output device 70 is the alpha-numeric character represented by the character codes in the next character position of the data train, i.e., the character immediately following the typeout instruction character on the program data train.

Any character representing character code shown in FIG. 5A, 5B, when positioned in the location next following the typeout instruction, will result in the character key on the keyboard 16 being activated when the typeout instruction is executed.

It can be seen from the foregoing discussion that the instruction representing characters shown in FIG. 5A, 5B, excluding the numeric characters "0" through "9", and the "flexofunction" instructions, serve a dual purpose. When positioned as an instruction on the program data train, each character code will direct a particular action by the program control section. However, character codes positioned in the address position (to be explained below) of an instruction have an entirely different function.

The programs executed by the apparatus of this invention comprise a plurality of selected ones of the instructions illustrated in FIG. 5A, 5B which are serially placed in the program data train by way of the keyboard 16 or by way of the tape reader 37 in the desired sequence.

3. Brief Description of Overall Operation

Figure 6:
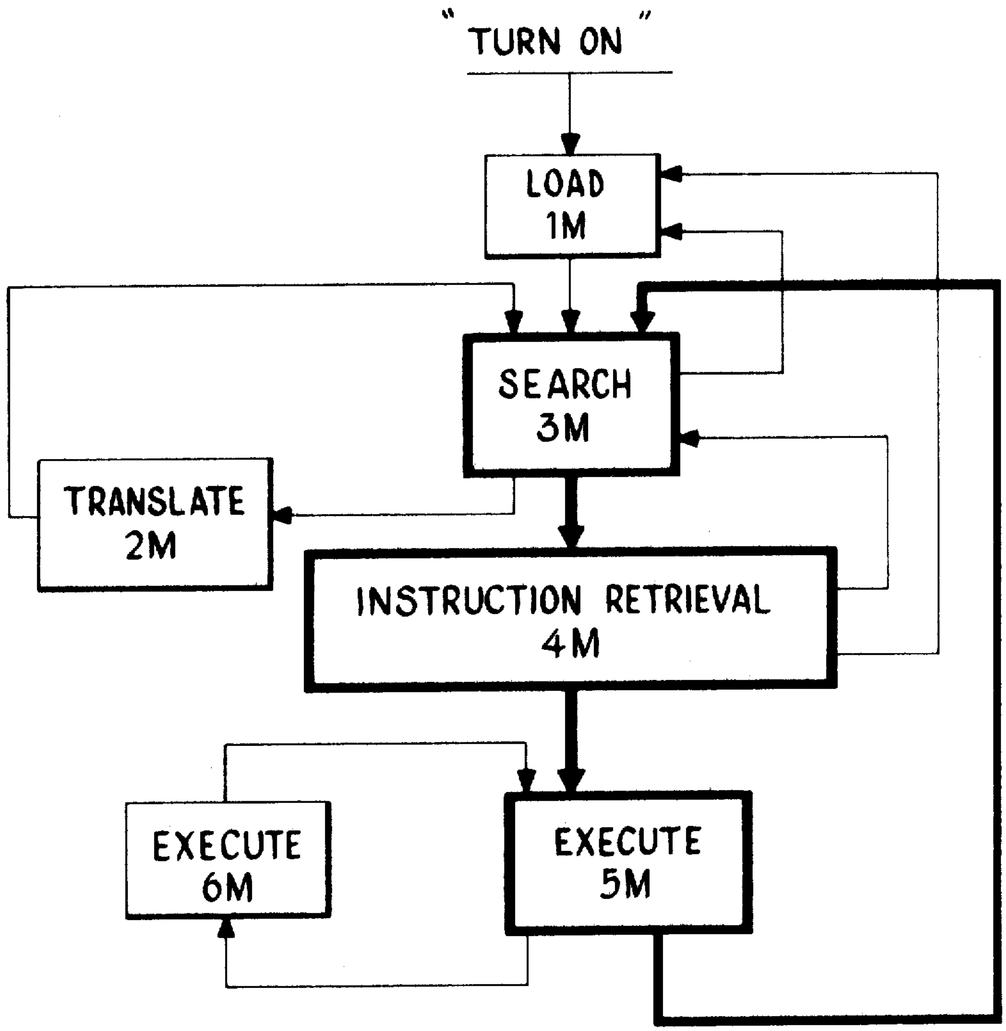
FIG. 6 illustrates the modes of operation of the present invention.
Figure 2:
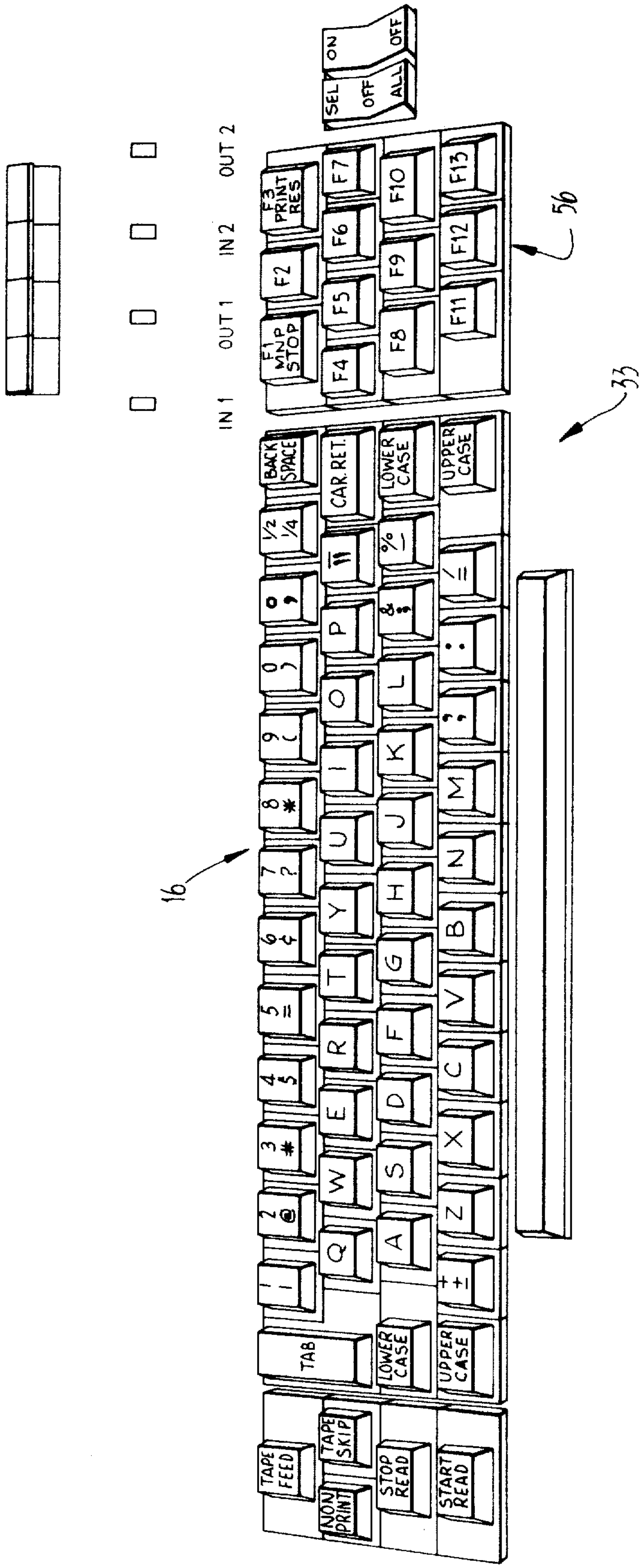

Briefly described, the operation of the present invention as shown in the block diagram of FIGS. 4A, 4B, and 4C is divided into six "modes," as shown in FIG. 6. Each mode represents a different count in the mode counter unit 125.

Once the machine is turned on, by depressing the on/off switch 53 (FIG. 1) on the input/output device 70, the mode counter unit 125 is automatically set to the "load" mode count by the control logic 72. As the machine 10 enters the load mode, the control logic 72 will set all of the flip-flops in the search register 80 (FIG. 4C) true. The search register will thus contain a code as representing a load marker and will shift this marker onto the data train of the program delay line in the character code position shown in FIG. 3 following the first three character positions which are reserved as discussed below. This marker will enable characters comprising one or more programs to be loaded on the delay line.

The purpose of the load mode is to load the program delay line 74 with instruction characters or codes. These instruction character codes, are entered into the machine 10 from the input/output device 70. They may be read from a prepunched paper tape by the tape reader 37, or they may be inserted from the keyboard 16. The first program character entered, of course, will be the unique code associated with the letter "H" representative of a sequence separator, and the second program character will be the program identification code associated with the particular program.

Once the load marker has been entered, program characters can be entered one at a time into the common register 78, beginning with a sequence separator. The machine 10 causes the program data train to recirculate through the search register 80. When the "load marker" appears in the search register 80, the control logic 72 will inhibit the program delay line 74 from writing in the contents of the search register 80, and instead will apply shift pulses to the common register 78, causing the input characters contained therein to shift out of the common register 78 and onto the program delay line 74 in the character position previously occupied by the load marker. Once the input character has been written onto the program data train, the control logic 72 applies shift pulses to the search register 80, causing the load marker contained therein to shift out of the register 80 and onto the program delay line 74 immediately following the newly inserted program character. Each character entered is thus written onto the delay line 74 and the load marker shifted down the program data train one character position until the operator terminates the load mode by depressing the load switch 45 on the input/output device 70. Once the program data train has been completely loaded, the load marker is cleared out of the program data train and the machine maintains an idling state until requested to perform or execute a program.

In the disclosed embodiment of the present invention, the number of instructions in each program may vary from one to several hundred and the number of programs may also vary from one to several dozen, one of the limitations on the number of possible programs is the number of individual program identification character codes available to identify each program. The present invention employs six-bit codes. This allows 64 distinct program identification codes and, therefore, 64 distinct programs may be identified on the program data train. By increasing the bit length of each program identification codes to seven, 128 programs would be possible.

Any character code input after the program data train has been loaded is recognized by the machine 10 as a request to perform the program in the program data train identified by a program identification character code identical to the one entered. Thus, a character code entry results in the machine searching the program data train for sequence separators. As each sequence separator is recognized, the machine compares the program identification character code following the sequence separator in the program data train with the program request character code entered into the common register 78.

Once the correct program is found or identified, the machine performs the program by copying the first instruction code from the program data train into the operation register 82 and inserting a special code termed an "instruction marker" into the program data train immediately following that instruction and shifting the following characters back one character position on the delay line.

The code representative of an instruction marker is the code shown in FIG. 5B associated with the Tape Feed Control. It is noted that this code is the same as the code for the load marker. Since the use of these two markers takes place during two different modes of operation, the same code for the two markers may be utilized.

The special code representative of an "instruction marker" is the code shown in FIG. 5B associated with the Tape Feed control. It is to be noted that the code for the "instruction marker" is the same as the code for the "load marker" or "-marker-normal" mentioned previously. It would be possible to have two different codes for the two markers, but since the use of the two markers takes place during two different modes of operation, the same code for the two different markers may be utilized. It can be appreciated that such common code for use in two modes of operation eliminates an unnecessary code decoding circuit.

The data train is then allowed to recirculate directly upon itself while the program control section causes the instruction defined by the code in the operation register 82 to be executed. When the machine 10 is ready to execute the next instruction, it merely searches the data train for the "instruction marker", copies the instruction code following it into the operation register 82, and moves the instruction markers into the space formerly occupied by the new instruction and the new instruction occupies the space formerly occupied by the instruction marker in the data train. Thus, the machine 10 sequentially performs all the instructions in the requested program and keeps track of its location within the program by an instruction marker in the data train.

Figure 11:
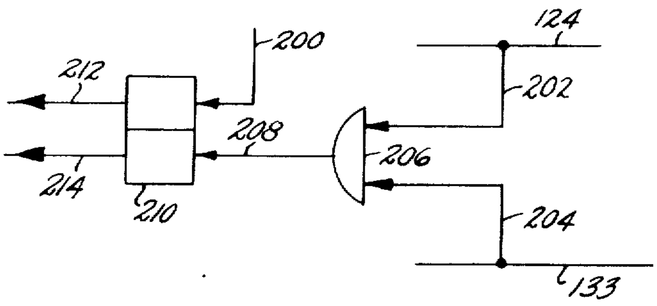
FIG. 11 illustrates a compare circuit utilized by the present invention.

Referring again to FIG. 6, and assuming that the program data train has been loaded and that the operator has depressed the load switch 45 (FIG. 4B), the machine will enter the "-search" mode, mode three. In this mode, the machine will search for sequence separators, once a program has been requested by the entry of a program request character code into the common register 78 (FIG. 4C) and will compare the identity character code of each program with the program request character code in the common register 78. The search for sequence separators is accomplished by causing the data train to recirculate directly upon itself and, at the same time, cause the operation register 82 to copy each character code as it emerges from the program delay line 74. During each character time the contents of the operation register 82 are checked by the operation register decoder 77. If the character code in the operation register 82 is not a sequence separator, the data train continues to recirculate. If, however, the character code is a sequence separator, the control logic 72 will cause the program request character code in the common register 78 to ring shift, that is, a shift pulse is applied to the common register 78, causing the code bits in the register 78 to shift to the right. As each code bit emerges from the register 78, it is recopied in the left-hand side of the register 78 through input select control 79. In six-bit times the character code has been completely recycled through the register 78 and resumes its original position. At the same time that the common register 78 is being ring shifted, the identification character code of the program whose sequence separator was just recognized, is emerging from the program delay line 74. Each bit of the identification character code, as it emerges and is rewritten back onto the program delay line 74 on line 120, is also compared with the corresponding emerging bit of the character code being ring shifted in the common register 78. Referring now to FIG. 11, it is seen that the serially occurring bits of the program request character in the common register appear on line 124 and are applied as one input of an OR-gate 206 by way of lead 202. The serially occurring bits of the program identification character simultaneously occur on line 133 and are applied as the other input of the OR-gate 206 by way of lead 204. The output, if any, from the OR gate is applied, by way of lead 208, to the reset side of a flip-flop 210 that is set prior to the compare operation by a signal from the control logic 72 on lead 200.

Assume now that the program request character being compared with a program identification character is not the same, then at least one bit position of one character will contain a pulse and the corresponding bit position of the other character will not contain a pulse. This causes an output from the OR-gate 206 on lead 208 that resets the flip-flop 210. Any remaining unequal bit positions have no further effect on the flip-flop and any remaining equal bit positions do not produce an output from the OR gate. Accordingly, the reset output of the flip-flop appearing on lead 214 is true and indicates to control logic 72 that the program request character and the program identification character are not the same.

Assuming now that the program request character and the program identification character are the same, then all bit positions are the same and no output will appear on the lead 208 from the OR-gate 206. Accordingly, the flip-flop 210 will remain set after having initially been set by control logic 72 via lead 200. This causes the set output of the flip-flop on lead 212 to remain true which indicates to control logic 72 that the program request character and the program identification character are the same.

In this manner, the machine searches the program data train for sequence separators and compares the identification character code of each program with the program request character code representing the identity of the requested program contained in the common register 78.

Assuming now that the comparison of the two character codes as described above was affirmative, indicated by the compare element 210 staying in its original set state at the end of the identity character time, the machine 10 will then insert an instruction marker into the search register 80 and will cause the output of the program delay line 74 to be copied by the search register 80 through the input select control 81. The output of the search register 80 is then copied by the program delay line 74 through input select control 85 and shift pulses are applied to the search register 80 to shift the instruction marker out of the search register 80 and onto the program delay line 74. These actions occur when the control logic 72 recognizes that the two compared character codes are the same. The instruction marker which was set into the search register 80 is, therefore, shifted out of the register 80 and onto the program delay line 74 immediately following the identity character code of the desired program, and the first instruction character code in the program is shifted into the search register 80. The machine 10 allows the remainder of the program data train to shift through the search register 80 and back onto the program delay line 74. The recirculation of the data train through the search register 80 continues during the home period and until the instruction marker again reappears and is decoded in the search register 80 by the search register decoder 75. Once the instruction marker has been decoded in the register 80, the machine leaves mode three and enters mode four, the instruction retrieval mode (see FIG. 6), where the control logic 72 causes the output of the program delay line 74 to be applied to the input to the delay line 74 through input select control 85 and enables the first instruction code to be copied into the operation register 82 by way of input select control 83. At the end of the character time required for the operation 82 to copy the first instruction code in the program, the program control logic 72 will again route the output of the program delay line 74 through the search register 80 and cause the output of the search register 80 to be applied to the input of the program delay line 74. Thus, the instruction marker, which was decoded in the search register 80, has now been displaced back in the program data train one character time and the first instruction code in the program has been advanced one character time to its original position, so that the instruction marker now follows, on the data train, the instruction code which has just been copied into the operation register 82. As will now be apparent, the length of the program data train has been increased by one character time due to the presence of the instruction marker.

The control logic 72 allows the data train to pass through the search register 80 until the home period and then advances from mode four to mode five, the "execute" mode (see FIG. 6). When mode five is entered, the program data train routing is switched to a direct recirculation so that the instruction in the operation register 82 may be executed.

Once the instruction has been executed, the machine leaves mode five and reenters mode three to search for the instruction marker as previously described. This process continues until every instruction in the program has been executed.

The machine recognizes that the end of the program has been reached and the last instruction in that program executed when it searches for the instruction marker, copies the next character code into the operation register 82 and decodes that character to be either a sequence separator, which is the sequence separator of the following program, or a space. The latter character will be decoded when the machine 10 is executing the last program on the data train.

Assuming that the instruction marker has been decoded in the search register 80 and the character code which follows it in the data train has been copied into the operation register 82 and is decoded as a space or a sequence separator, the control logic 72 will simply allow the data train to continue to recirculate directly until the home period. This removes the instruction marker from the data train and the machine 10 waits in mode three for another request to execute a program.

Mode six, as seen in FIG. 6, is a special execute mode to which the machine will advance for particular instructions.

The control logic 72, as previously stated, determines the routing of the data train during the above-described modes. This is achieved by logic responsive to counts in the mode counter unit 125, the phase counter unit 126, the decimal counter unit 127 and pulses produced by the timing chain 76 that enable the various input select control elements and which cause the registers to shift. The control logic 72 also controls the count in the counter units 125, 126 and 127 by logic responsive to the timing chain 76 and the contents of the registers, such as a sequence separator being decoded in the operation register 82 during the search mode. The count in the decimal counter unit 127 is set by the control logic 72 to reflect the function being performed by the machine. For example, the decimal counter unit 127 is set to a predetermined count during mode three when the machine is searching for sequence separators. It is set to another predetermined count during mode three when the machine is searching for an instruction marker. By thus employing the counter unit 127, the machine 10 can keep track of whether it is searching for a sequence separator or an instruction marker during the search mode three. Generally, the phase counter unit 126 is employed to advance from one count to another during each mode to provide a reference that determines the routing of the data train for that mode. For example, during a search in mode three for a sequence separator determined by reference to the decimal counter unit 127, it is the phase counter unit 126 which is affected when a sequence separator is decoded in the operation register 82. By the phase counter unit 126 changing its count upon the occurrence of this event, the logic in the control logic 72, which causes the common register 78 to ring shift, is enabled.

The translate feature of the present invention, briefly described, causes the control logic 72 to recognize that each program on the data train is identified, not by one character code, as in normal operate, but by three character codes. During the machine's operation during translate mode, each program on the data train begins with a special code termed a "-translate sequence separator," which is different from the sequence separator normally used, followed by three character codes which identify that program. The special code for the translate sequence separator is shown in FIG. 5A as the code associated with the keyboard character "L."

The only difference between the operation of the machine during translate and normal operation is the manner in which it searches for a program. During normal operate, one program request character code is entered into the common register 78 and the machine commences a search for a program identified by that character. During translate, however, a four-level search is made for a program. The first level search is made after three character codes have been entered into the machine. If this search is not successful, that is, if the control logic 72 does not find a program on the translate program data train, which is identified by these three character codes, the machine will accept two more character codes and make a second level search for a program identified by the first character code entered for the first search and the two newly entered character codes. If this second level search is also unsuccessful, the machine will accept one more character code input and make a third level search for a program, identified by the first character code of the first three inputs for the first search, the first character code of the two inputs for the second search and the final character code last entered. If this third level search is also unsuccessful, the machine 10 will automatically search for a program identified by three blank character codes.

Assuming that the machine (program delay line 74) has been loaded with translate programs, that is, programs or individual instructions identified by three character codes and that the translate switch 47 (FIG. 4B) has been depressed, the machine will remain in an idling state in the "translate mode," mode two, seen in FIG. 6. The purpose of mode two is to allow multiple inputs into the machine 10 for the various programs searches. Once the program identifying character code inputs from the keyboard 16 are complete, the control logic 72 will cause the machine to jump to mode three to conduct the search for the program. The first time the machines enters the translate mode, it will accept three character code inputs before it makes a search for a program.

If the first level search is unsuccessful, the machine returns to mode two but this time will accept only two character code inputs before commencing the second level search.

If the second level search is unsuccessful, the machine will return to mode two, but will accept only one character code input this time, before initiating the program search in mode three.

For the first level search, the first character code from the keyboard is accepted into the common register 78 (FIG. 3C), ring shifted to check parity and at the same time is copied by the search register 80 by way of line 124 and input select control 81. A second character code from the keyboard is then accepted into the common register 78, ring shifted, and is also copied by the search register 80 with the first character code contained in search register 80 being shifted into the operation register 82 by way of line 128 and input select control 83. Finally, a third character code from the keyboard is accepted into the common register 78, ring shifted for parity, and then the search for a program is commenced. This search is similar to the normal search previously described, except that as each translate sequence separator is recognized, the three identity character codes which emerge from the program delay line 74 immediately following the translate sequence separator are compared to the three character codes in the three registers 78, 80 and 82. To accomplish the comparison, the output of the common register 78 is connected to the input of the search register 80, the output of search register 80 is connected to the input of operation register 82, and the output of operation register 82 is connected to the input of common register 78. Shift pulses are then applied to the registers for three character times, so that at the end of the comparison time, the three identity character codes have been completely recycled and have assumed their original positions. During this extended ring shift, the bits of each character code in the registers are compared with the three identification character codes of the program which are emerging from the program delay line 74 in a manner as described above in conjunction with FIG. 11. Again, if they are the same, the compare bistable element 210 remains set at the end of the comparison time. If they are not the same, the comparison bistable element is reset. If the comparison results in an affirmative indication, the machine 10 marks the program data train in the same manner as it would during the normal operate and executes the program as it would during normal operate. If the comparison is not favorable, the machine 10 continues to search to the end of the program data train. If the entire program data train passes without the desired program being found, the machine 10 will leave mode three and reenter mode two and accept two more character code inputs from the keyboard. The first input character code is accepted into the common register 78, ring shifted, and copied by the search register 80. The second character code input from the keyboard is also accepted into the common register 78 and ring shifted, but the search register 80 does not copy the character code during the ring shift of the common register 78. The machine 10 then reenters mode three to conduct the second level search for a program identified by the first character code from the first three keyboard inputs now in the operation register, and the two new character code inputs now contained in the search register 80 and the common register 78, respectively. If this search is unsuccessful the machine returns to mode two and accepts one character code from the keyboard into the common register 78, which is ring shifted for parity but not copied by search register 80, and then returns to mode three to search for a program identified by the first character code entered for the first search which is contained in the operation register 82, the first character code entered for the second search which is contained in the search register 80, and the character code just entered which is contained in the common register 78. If this search is not successful, the control logic 72 causes the three registers to be reset or cleared to all zeros and automatically makes a fourth search for a program identified by three blank codes.

The control logic 72 keeps track of which level search is being conducted during the translate operation by setting the decimal counter unit 127 to a three count for the first three inputs during mode two. If the first level search is completed in mode three with no program having been found, the decimal counter 127 is counted down one count to a two count before the machine returns to mode two. By referring to the decimal counter unit 127, the control logic 72 can determine how many inputs to accept during mode two.

It will be observed from the foregoing discussion that the present invention does not require that the memory device or program delay line 74 contain a means of identifying the location occupied by each instruction code, as is required by presently known machines. Due to the use of a recirculating program data train in the machine 10, and the unique and novel manner employed to indicate the beginning of a program, the identification of an exact location of the first instruction code in a program is not necessary. This feature allows a considerable saving in cost. It will also be observed that the unique and novel manner employed in marking a position within a program indicating where the next instruction is to be found, obviates the necessity of using an instruction counter which present machines use to retain the location or address of the next instruction. This results in a saving in structure and circuitry by eliminating both the instruction counter and the extra memory space and associated structure required to identify locations within the memory.

4. Operational Modes a. Load

Referring now to FIG. 6 there is shown a block diagram of the modes of operation of the present invention.

The initial turn-on of the machine 10 sets all the control flip-flops to an initial condition, setting both the phase counter unit 126 (FIG. 4A) and the mode counter unit 125 to a one-count configuration and launches the SYNC pulse on the program delay line 74.

Setting the mode counter unit 125 to a one-count configuration causes the machine 10 to enter mode one. In mode one, the load mode, the machine 10 will set a load marker, comprised of all ones, in the search register 80. This load marker is read onto the program delay line 74 in the fourth full character space the SYNC pulse being located in the first bit position of the first character space, which can be seen in FIG. 3. The machine 10 will then idle, waiting for an input from the input/output device 70. The input may comprise one or more programs or a plurality of instructions from which one or more programs may be constructed. The input may be entered by way of the keyboard 16 of the keyboard 16 of the automatic writing machine 33 or by way of the tape reader 37.

An input character code into the machine 10 is entered into the common register 78 and checked for parity. If the parity of the input character code is correct, the machine 10 will recirculate the program data train 74, through the search register 80 (see FIG. 4C). When the load marker previously placed on the data train is recognized as appearing in the search register 80, the common register 78 will be read onto the program delay line 74 while the search register 80 retains the load marker. At the end of the character time required for the input character code to be shifted out of the common register 78 and copied onto the program delay line 74, the program delay line 74 will then copy the contents of the search register 80, shifting the load marker contained in register 80 onto the program delay line 74 behind the former contents of the operation register 78. Each time a character is loaded onto the program delay line 74, the configuration of a character input counting means (not shown) in the arithmetic section of the machine is changed. The machine 10 will continue to load characters in the manner above-described until either the character input counting means reaches a terminal configuration indicating the program data train contains the maximum number of characters allowable, or the load switch 45 on the input/output device 70 is depressed, indicating that the program has been completely loaded. Once the load switch 45 has been depressed, the program data train will contain the entire program read from the input device 70 with the load marker positioned at the end of the data train. Before any further action can take place, this load marker must be removed from the data train and the machine 10, accordingly, stepped to the search mode, mode three.

In mode three, the program data train will be recirculated through the search register 80. When the load marker is recognized as appearing in register 80, the recirculation path of the data train will change to a direct recirculation loop on line 120, as seen in FIG. 4C. Having thus removed the load marker from the data train, the machine 10 will then return to an idling condition, awaiting further directions from the input/output device 70.

b. Normal Program Search and Instruction Retrieval.

At this point the data train includes a series of pulses comprised of the first pulse in the data train, the SYNC pulse, followed by five-bit times which are vacant, two full character times of six bits each which are vacant, and a series of character codes followed by a home period where no pulses appear.

The series of character codes on the program data train may be one individual program with a sequence separator as the first character code followed immediately by an identification character code which identifies the program, or it may be a series of individual programs, each separated from the adjacent programs by a sequence separator followed immediately by an identification character code which identifies that particular program.

A program request character code entered from the input/output device 70 into the common register 78, when the machine is in an idling state, will be recognized as a request to the machine to perform a program identified by that character code. When a character code is entered into the common register 78, requesting a particular program, the machine will ring shift the common register 78 for six-bit times to check the parity of the character code.

Once the parity of the input character code has been determined to be correct, the machine 10 will wait for the initial pulse, the SYNC pulse, of the data train on the program delay line 74 to appear. When the SYNC pulse emerges from the program delay line 74, the machine 10 will wait for five-bit times following the SYNC pulse, and, when the first full character time following the SYNC pulse occurs, the character code in the common register 78 is again ring shifted one character time, and the character code contained therein is copied onto the program delay line 74. At the end of the first full character time following the SYNC pulse, the character code entered into common register 78, identifying the program which the operator desires to be performed, is contained in common register 78 and has also been written onto the program delay line 74 in the "program address storage" character space on the delay line 74, as seen in FIG. 3. The character code is stored in this position in the program data train to allow the machine 10 to utilize the common register 78 in subsequent logical actions and still retain the identification character code for the program which is being performed.

The machine 10 waits one more full character time, seen in FIG. 3 as the "branch program address storage" character location, and then recirculates the remaining character codes on the delay line 74 directly while causing the operation register 82 to copy them, looking for a sequence separator. After each sequence separator is decoded in the operation register 82, the machine 10 will cause the requesting character code in common register 78 to be ring shifted, and compared bit-by-bit with the identification character code emerging from the program delay line 74. When the comparison indicates that the correct program has been located, the control logic 72 will cause an instruction marker, (described previously), to be set into the search register 80. This instruction marker will be copied into the program data train immediately following the identification character code and preceding the first instruction of that program. This is accomplished in the manner now described. Immediately after the code for an instruction marker is placed into the search register 80 by the control logic 72, the data emerging from the delay is caused to shift through the search register 80 and, in so doing, the content of the search register is shifted into the delay line 74. It will thus be understood that the instruction marker code is placed into the delay line in the character time location associated with the first instruction character code for that program, and the remaining or subsequent characters will be rewritten onto the delay line one character position later than their normal character position. In other words, the data train is opened at the first instruction character position and the subsequent characters are shifted backward or delayed one character position on the delay line. The machine 10 will delay until the home period of the data train occurs. When the SYNC pulse again emerges from the delay line 74 following the home period, the machine 10 will wait the five-bit delay time following the SYNC pulse and two full character periods until the first character code of the data train emerges. The program control logic 72 will again cause the data train to recirculate through the search register 80. As each character code is read into the search register 80, the search register decoder 75 decodes the character code and generates a signal to the program control logic 72 to indicate what the character code is. When the instruction marker which was inserted following the identification character code of the program which is desired to be performed appears in search register 80, as indicated by a signal from decoder 75, the control logic 72 will cause the operation register 82 to copy the instruction character code immediately following the instruction marker and at the same time apply the instruction character code to the input of the program delay line 74. Once the first instruction character code has been copied into register 82 and by the program data train, the control logic 72 will connect the program delay line 74 for recirculation through the search register 80. When this occurs, the instruction marker which was retained in register 80 is shifted out of the register 80 and onto the program delay line 74, followed by the series of character codes emerging from the program delay line 74. Thus, what has occurred is that the instruction data train from the program delay line 74 was recirculated through the search register 80 until the instruction marker was decoded by the decoder 75. The output of the program delay line 74 was then switched to allow the operation register 82 to copy the instruction code immediately following the instruction marker and also apply it to the program delay line 74. After one character time, the data train was routed again through the search register 80, causing the normal instruction marker contained in the register 80 to be copied onto the program delay line 74 immediately following the instruction code just copied into register 82. Thus, the instruction marker and the first instruction character exchanged positions on the program data train.

As each instruction is performed, the machine will repeat the above-described process, searching the data train for the instruction marker from the SYNC pulse down the entire length of the data train. The instruction marker, when decoded in register 80, is delayed one character time to allow the operation register 82 to copy the instruction character code immediately following the instruction marker and also to allow the program delay line 74 to copy that instruction character code into the space formerly occupied by the instruction marker. The instruction marker is then shifted onto the program delay line 74 immediately following that instruction character code and in the space formerly occupied by said instruction character code. Each instruction character in the requested program is, therefore, performed sequentially with the instruction marker being shifted down the program sequence one character position at a time as a "bookmark" to indicate the position of the next instruction to be performed.

Once the operation register 82 contains code for the instruction to be performed, one of several actions may be taken by the machine. If the instruction code defines an arithmetic type of instruction, such as add, subtract, multiply, divide, the machine will advance to the execute mode, mode five. In that mode the program data train is caused to recirculate upon itself through lead 120, while the control logic 72 instructs the arithmetic control logic 86 (FIG. 4B) to perform the specific instruction contained in the operation register 82. When the control logic 72 receives a signal from the arithmetic control logic 86, indicating that the arithmetic section has completed performance of the instruction, it will cause the machine 10 to return to mode three and initiate a search for the next instruction code to be performed.

When the last instruction code in a particular program has been copied into the operation register 82 and the instruction marker from the search register 80 has been shifted onto the delay line 74 immediately following that instruction code, the instruction marker's position immediately precedes the sequence separator of the following program. After the instruction defined by the code in operation register 82 has been performed and the machine decodes the instruction marker in search register 80, the operation register 82 will copy the character code immediately following the instruction marker, which, in this case, is the sequence separator for the following program. This character code is also applied to the input of the program delay line 74 as previously discussed. When this sequence separator is decoded by operation register decoder 77, the control logic 72 recognizes this character code as a sequence separator and not an instruction to be performed. The data train on the program delay line 74 is, therefore, allowed to continue to recirculate directly upon itself and the instruction marker contained in search register 80 is not shifted onto the line but is retained within the register 80, thereby removing the instruction marker from the program data train. The machine 10 will then return to an idling state, awaiting a new character code input from the input/output device 70.

If, during the execution of a selected program, an instruction code read into the operation register 82 is determined to be a code for an addressable instruction, that is, an instruction requiring the next one or two character codes following that instruction code on the delay line 74, in order to completely define a particular operation, the above-described instruction code retrieval process is altered.

As each instruction code is copied into the operation register 82, the control logic 72 also enables the common register 78 to copy the data train emerging from the program delay line 74. If the instruction defined by the code in the operation register 82 is recognized as a single address instruction, the control logic 72 will allow the common register 78 to copy the immediately following instruction code emerging from the delay line 74 at the same time that the delay line 74 is having that code entered therein from line 120. At the end of this address character time, the control logic 72 will then cause the instruction marker in search register 80 to be shifted onto the delay line 74 immediately following the instruction code previously copied by the common register 78 and onto the delay line 74.

If the instruction defined by the code (termed dominant code) in the operation register 82 is recognized as a double address instruction, requiring the two instruction codes immediately following it on the program data train to define a complete executable instruction, the control logic 72 will cause the common register 78 to copy the first code emerging from the delay line following the first double address instruction code and also cause the data train emerging from delay line 74 to recirculate through the search register 80, shifting the instruction marker contained in register 80 onto the delay line 74 immediately following the instruction code previously copied by the operation register 82. At the end of the first address character time, the control logic 72 will cause the code bits contained in the common register 78 to be shifted into the decimal counter unit 127 by way of cable 119. During the second address character time, the control logic 72 will cause the common register 78 to shift the first address character code onto the program delay line 74 and copy the second address character code. The control logic 72 also causes the search register 80 to copy the second address character code. At the end of the second address character time, the search register 80 is prevented from copying the contents of the program delay line 74 while the data train on the delay line 74 is recirculated through the common register 78. Therefore, at the end of the three character times comprising the double address instruction, the data train has the dominant character code followed by the instruction marker, then the first and second address instruction character codes, respectively, the decimal counter unit 127 contains the first address instruction character code, the search register 80 contains the second address instruction character code and the operation register 82 contains the dominant character code. The data train on the program delay line 74 is recirculating through the common register 78.

When the machine returns to mode three to search the program data train for the instruction marker after having executed a double address instruction, it is apparent from the above description that after the instruction marker is decoded in the search register 80, the machine must ignore the two character codes on the data train which follow the instruction marker. This is due to the machine 10 inserting the instruction marker in the data train immediately following the dominant character and before the two passive characters of the three-character code instruction. A delay of this type is not required after the machine 10 executes a single address instruction since the instruction marker is placed on the data train following the passive character, address character, of the two-character instruction.

c. Unconditional Branch

One of the instructions seen in FIG. 5A, 5B is the "unconditional branch" instruction, a single address instruction associated with to the E key of the writing machine 33. To perform the unconditional branch instruction, the control logic 72 is required to search the program data train for a secondary program identified by an identification character code corresponding to the address character code of the unconditional branch instruction. That is, when the unconditional branch instruction is decoded in the operation register 82, the program control logic 72 will initiate a program search routine, searching the program data train for sequence separators and comparing the identification code of each program with the address character code, associated with the unconditional branch instruction code, which is retained in the common register 78. When the particular secondary program is found the program control section will perform the instructions in that program sequentially.

During the execution of this secondary program, the program control section will use a unique code or branch instruction marker to mark the position within the secondary program, which marker is different from the "normal" instruction marker. The branch instruction marker code as seen in FIG. 5A, 5B is associated with the keyboard character for degree (°) and apostrophe ('). The use of a unique branch instruction marker is required to prevent the control logic 72 from confusing the instruction marker, which marks the position in the primary program from which the unconditional branch instruction was obtained, with its position in the secondary program which it is executing.

Upon completion of the secondary program, the control logic 72 will cause the machine 10 to return to the position in the primary program from which the unconditional branch instruction was obtained and continue the execution of that program. Each secondary program to which the program control section will branch will be terminated by a return instruction code which is associated with the keyboard character "R" as seen in FIG. 5A.

It is necessary for the machine's programmer to include the return instruction as the final instruction in any secondary program which he includes on the program data train if he wishes to return to the original program, otherwise the program control section upon completion of a secondary program, may simply return to an idling state, to await further directions from the input/output device 70. When the return instruction code is entered into the operation register 82, and the program delay line 74 simultaneously, the control logic 72 will cause the search register 80, which contains the branch instruction marker, to be reset to zeros. The machine 10 will then return to the search mode and examine the character codes emerging from the program delay line 74, one by one, looking for the instruction marker indicating the position in the primary program from which the unconditional branch instruction code was originally obtained and where the program control section must now return to complete execution of the primary program.

When the unconditional branch instruction code in the primary program was originally copied into the operation register 82 and its address character code copied into the common register 78, the machine 10 delayed until appearance of the SYNC pulse following the home period, and, at the beginning of the second full character time following the SYNC pulse, ring shifted the common register 78 allowing the bits emerging from the common register to be entered into the program delay line 74. Therefore, the program data train now includes branch storage data in the third character position (FIG. 3), i.e. the identification code of the secondary program to which the program control section was to branch.

If, during the execution of a secondary program a subsequent unconditional branch instruction code is decoded in the operation register 82, the branch instruction marker which preceded the unconditional branch instruction code on the data train contained in search register 80 is lost by the control logic 72, causing register 80 to be set to zeros. The address character code of the first branch instruction is retained in the common register 78 and the program control section will cause the machine 10 to search for the new secondary program indicated by the address character code in register 78, after the program identification character code of the new secondary program has been recorded in the branch program address storage position near the head of the data train.

This new secondary program identification character code replaces the original secondary program character code written into the branch program address storage position when the first branch instruction was executed. A return instruction code at the end of the new secondary program will cause the program control section to return to the position in the primary program from which the original unconditional branch instruction was obtained in the manner previously described.

The unconditional branch instruction allows the programmer to include a secondary program on the data train which may be used a multitude of times in many different primary programs. For example, a particular routine or secondary programs may be universal to several primary programs. Instead of including that secondary program in each program on the data train, the programmer will separate that secondary program. When that particular secondary program is required during the execution of a primary program, the unconditional branch instruction will cause the machine to jump to that secondary program to perform it and then return to the primary program. This capability allows a considerable saving in program storage capacity.

d. Conditional Branch

If, during the execution of a conditional branch instruction, such as a program, a "positive branch" instruction code or "-negative branch" instruction code associated with the keyboard characters "C" and "G" respectively, as seen in FIG. 5A, is decoded in the operation register 82, the program control section will search for a particular "resume" instruction code associated with the keyboard character "A", as seen in FIG. 5A. The resume instruction is a single address instruction. The address character code of the resume instruction following the instruction code is the means by which the program control section can identify which particular resume instruction code the positive or negative branch instruction has directed it to search for. The positive and negative branch instructions are also single address instructions. The address character code contained in the address location of these instructions is the identification code of the particular resume instruction to which the program control section must search for. It should be understood at this time that the positive branch instruction will not be executed by the program control section when decoded in the operation register 82, unless the arithmetic control logic 86 provides a positive indication. The negative branch instruction will not be executed unless the arithmetic control logic 86 provides a negative indication.

Assuming that the program control section has just executed an instruction and has copied the instruction code following the instruction marker, which copied instruction happens to be a conditional branch instruction, into the operation register 82, the control section recognizing a conditional branch instruction will cause the search register 80 to copy the character code following the conditional branch instruction code, destroying the instruction marker which the register 80 contained. The search register 80 now contains the identification character code for the particular resume instruction to which the machine will branch. When the SYNC pulse appears at the head of the data train, following the home period, the machine will delay the five-bit delay time following the SYNC pulse and copy the character contained in the "program address storage location" into the common register 78. The control section delays one more character time for the "-branch program address storage location" and then commences a character-by-character search of the following instruction character codes on the data train, looking for a sequence separator. As each sequence separator is recognized, the identification character in the common register 78 is ring shifted and compared to the identification character in the character position following the sequence separator. This process continues the entire length of the program data train until the program is located, from which the positive or negative branch instruction was obtained. When the correct program has been found, the character code in the search register 80 is shifted into the common register 78 and the instruction codes in the program are examined one by one, looking for resume instruction codes. As each resume instruction code is decoded in the operation register 82, the identification character code in the common register 78 is ring shifted and compared to the identification character code for the resume instruction. When the correct resume instruction has been found, the machine will cause a normal instruction marker to be set into the search register 80, and will then shift the instruction marker onto the delay line 74 following the identification character code of the resume instruction. The machine 10 will then wait until the SYNC pulse appears at the head of the data train following the home period, and then commence the normal instruction marker search. When the instruction marker is found, the machine 10 will then commence to execute the instructions following the marker, as previously described.

If the positive or negative branch instruction had been decoded in register 82, while the machine was executing a secondary program to which it had branched from a primary program, the same action would take place as described above, except that when the identification character of the program was copied by the common register 78 from the front of the data train it would be from the character in the "branch program address storage" position and not the "program address storage" character. Also, when the correct program, in this case the secondary program, was found and the correct resume code identified in that program, the code inserted into the search register 80 would not be the instruction marker but instead would be the branch instruction marker.

Unlike the unconditional branch instruction, the conditional branch instructions do not result in the program control section marking the location from which the branch instruction was obtained. In the case of an unconditional branch instruction, the machine will branch from the primary program to the secondary program and, upon the completion of the secondary program, return to the position in the primary program from which the unconditional branch instruction was obtained. The conditional branch instructions, however, do not provide for the program control section to return to the position in the program from which the conditional branch instruction was obtained. The machine will branch to the resume code as commanded by the conditional branch instruction and resume computation from that point to the end of the program.

The conditional branch instructions provide the machine with the capability of either skipping instructions in a program or reiterating instructions. That is, when the conditional branch instruction code is decoded in the operation register 82, during the execution of a program, the machine 10 will return to the beginning of the program from which the branch instruction was obtained, and examine each instruction, looking for the correct resume instruction. The resume instruction to which the machine 10 branches may be placed, by the programmer, either preceding the conditional branch instruction, or following the conditional branch instruction in the program. If the resume code precedes the conditional branch instruction, the machine 10 will begin computation from that point, reiterating the instructions following the resume code to the branch instruction. If the resume instruction follows the conditional branch instruction in the program, the machine will skip the instructions between the conditional branch instruction and the resume instruction.

Also pertinent to conditional branch instructions is that the search for the particular resume instruction to which the machine is branching commences with the first instruction in the particular program from which the conditional branch instruction was obtained, and continues character-by-character down the program data train. The search for the resume instruction does not terminate at the end of the program in which the conditional branch instruction was obtained, but continues down the entire length of the program data train, and, if the required resume instruction is not found, the machine returns to the front of the program data train and continues to search. This capability provides the knowledgeable programmer with a form of an unconditional branch instruction, that is, the conditional branch instruction may result in the program control section executing an entire program separate from the primary program. This would be accomplished by placing the particular resume instruction to which the machine 10 is required to branch, as the first instruction in a program on the program data train subsequent to the program from which the initial branch instruction was obtained. Upon completion of this secondary program, the machine would return to an idling state, awaiting further direction from the input/output device 70, and would not return to the primary program from which it had branched.

e. Flexofunction Instruction

A second group of instructions are zero address instructions. These instructions, when decoded by the machine, cause the input/output device 70 to take a particular action, such as turning the tape punch 35 and tape reader 37 on or off. During the execution of a program, an instruction code emerging from the delay line 74 is copied by the common register 78. In the event the instruction decoded in operation register 82 is one of this second group of instructions, the control logic 72 will enable the control gates in control element 88 to drive the line drivers 89 corresponding to the particular action required by the instruction code in common register 78. The output of the line drivers 89 will cause the particular input/output device to activate or deactivate.

f. Halt

If the halt instruction associated with the keyboard character "Q" as seen in FIG. 5A is copied into the operation register 82 and decoder 77 during the execution of a program, the machine will halt computation and remain in an idling condition, recirculating the data train on the program delay line 74 directly. The machine will remain in the idling condition until a signal from the "Field Switch 1" 65 in FIG. 4B is received by the control logic 72. Upon receipt of this signal, the program control section will recommence computation or processing with the instruction following the halt instruction in the program being executed. The halt instruction allows the programmer to stop the machine and place it in an idling state during which time descriptive material may be typed on a form contained in the writing apparatus 33. The operator terminates the halt condition by tabbing the carriage 60 to a point where "Field Switch 1," 65, is activated.

g. Translate Feature

During normal operate, the programs on the program delay line 74 are recognized as being separated by a sequence separator followed by a single identification character which identifies each particular program. The machine may also operate in a "translate" mode when the operator has depressed the translate switch 47. During the translate mode of operation, the programs and/or instructions on the program data train are recognized as being separated by a "translate program sequence separator", seen in FIG. 5A as the "L" character having bits in the 1, 2 and 7 bit positions, followed by three characters codes which identify each program on the line. The translate mode is used only when the program delay line 74 has been loaded with a special program data train from special translate tape containing a plurality of programs and/or instructions which incorporate the above-described characteristics. As described hereinbelow, the translate mode enables new programs to be easily and readily obtained.

When the machine is operating in the translate mode, the search for a program, from which one or more new programs can be obtained, is altered from a search for a program identified by one identification character to a search for a program identified by three identification characters. The operator of the input/output device 70 will indicate the program which he desired to be executed by entering three identification characters codes from the keyboard 16 of the input/output device 70 into the program control section. The first identification character code is received from the keyboard 16 into the common register 78, as previously described. This character code is ring shifted as normal to determine the parity of the character. At the end of the character time required for the first input character code to be ring shifted, the search register 80 also contains the character code. Once the parity of the first character code has been determined to be correct, the machine 10 will accept a second character code into the common register 78. The second character code is also ring shifted and copied by the search register 80. The first character code contained in search register 80 is shifted into the operation register 82 as the second character code from the common register 78 is being shifted into the search register 80. At the end of the character time required to determine the parity of the second character code, the operation register 82 contains the first character code entered, the search register 80 contains the second character code entered, and the common register 78 also contains the second character code entered. If the parity of the second character code was determined to be correct, the machine will accept a third input into the common register 78. The third character code entered is also ring shifted to determine its parity. However, during the ring shift, the search register 80 does not copy the character code as it is being shifted. At the end of the character time required for the ring shift of the third character code, the operation register 82 will contain the first character code entered, the search register 80 will contain the second character code entered, and the common register 78 will contain the third character code entered.

Before the first character code is entered from the input/output device 70, the operator may "space" or "tab" the automatic writing machine 33 without the machine 10 recognizing these operations as character inputs. When the operator spaces or tabs the writing machine 33, these operations generate input codes to the common register 78 which are decoded. The control logic 72 will accordingly cause the common register 78 and the search register 80 to be reset following the ring shift of the input character code such that the "space" or "tab" operations will be ignored.

Once the three identification character codes are contained in the registers as above described, the program control section will commence a search which is similar to the normal program search. The program control logic 72 will cause each character code emerging from the program delay line 74 to be examined for a "translate sequence separator". As each translate sequence separator is recognized, the program control logic 72 will cause the common register 78, search register 80 and the operation register 82 to form one shift register. The output of the common register 78 is connected as an input to the search register 80, the output of search register 80 is connected as an input to the operation register 82, and the output of operation register 82 is connected as an input to the common register 78. The control logic 72 causes a shift pulse to be applied to each of the registers, resulting in the bits contained in each register being shifted out of that register and into the subsequent register to which it is connected. In this manner, the character codes contained in the three registers are ring shifted for three character times. At the end of the three character times, the character codes again occupy their original positions. As the bits of the character codes emerge from the operation register 82, to be copied by the common register 78, they are compared to the bits emerging from the program delay line 74, which are the bits of the three character codes identifying the program in a manner as described above. If the comparison indicates that the correct program has been found, the instruction marker is set into a search register 80 and the program data train is recirculated through register 80 back into the delay line 74, thus inserting the instruction marker into the program data train immediately following the third identification character code of the requested program.

The program control section allows the data train on the program delay line 74 to recirculate through the search register 80 until the following home period once the correct program has been found. When the SYNC pulse appears at the head of the data train from the delay line 74 following the indicated home period, the machine will commence a character-by-character search for the instruction marker previously inserted into the data train. When the instruction marker is recognized as appearing in the search register 80, the program control section will commence execution of the program so marked.

If the search for a program identified by the three characters was unsuccessful, the machine will return to an idling mode to wait further character code inputs. At this point, the machine will accept the first character code entered into the common register 78 and ring shift it to check parity as above described and at the same time copy the character code into the search register 80. The second character code entered will also be accepted by the common register 78 and be ring shifted. The search register 80, however, will not copy the second character code in the common register 78 as the character is ring shifted. The machine 10 will then commence a second translate program search. As each translate sequence separator is recognized during the search, the three registers will be ring shifted for three character times to compare the character codes contained in them with the three character codes following the translate sequence separator on the delay line 74. The contents of the three registers during the second translate program search differ from the contents during the first search by the character codes in the search register 80 and the common register 78. During the second program search, the operation register 82 still retains the first character code of the three character codes entered for the first program search, the search register 80 contains the first character code entered following the first program search, and the common register 78 now contains the second character code entered following the first program search.

If the search for a translate program is successful, the program control section will initiate the normal instruction withdrawal procedure. If however, the search is unsuccessful, the machine will return to an idling condition, awaiting one more character code input, which will be accepted into the common register 78. When the character code is entered, it is ring shifted in the common register 78 as usual, however, the search register 80 will not be allowed to copy it. The machine 10 will then commence a third translate program search looking for a program identified by the three character codes in the three registers. The operation register 82 contains the first character code entered for the first translate program search, the search register 80 contains the first character code entered for the second program search, and the common register 78 now contains the first character code entered for the third program search.

If the search for a program identified by these three characters is unsuccessful, the program control section will cause the three registers to be reset to zeros, and a fourth translate program search initiated. During this fourth program search, the program control section will look for a program identified by three blank character codes. A program identified in this manner will be included in every translate tape and will contain instructions which will direct the machine to type out an indication to the operator that the program he has requested is not contained within the data train on the program delay line 74.

The search for a program during the translate mode then consists of a four level search which enables new program to be generated by the use of three or less identifying words, which may be in English or any other language. The machine, for example, will accept the first three characters of a first identifying word entered and conduct a first level search for a program identified by these three characters. If this search is unsuccessful, the machine will then accept the first two characters of a second identifying word entered and conduct a second level search for a program identified by the first character of the first word and the first two characters of the second word. If the second level search is also unsuccessful, the machine will accept the first character of a third identifying word entered and conduct a third level search for a program identified by the first character of the first word, the first character of the second word and the first character of the third word. If the third level search is also unsuccessful, the machine will cause the three registers to be reset to zero and conduct a fourth level search for a program identified by three blanks. This program is an error program that indicates to the operator that no such program is present on the program delay line 74.

The first word entered by an operator during the translate mode may be comprised of several characters. Since the machine accepts only the first three characters and conducts its search so rapidly, approximately 10 milliseconds or one pass of the program data train, it is necessary that logic be provided which will prevent the machine from accepting, say, the fourth character of the first word as the first character of the second word. Accordingly, the machine, after conducting the first level search, will not accept subsequent characters until the operator "spaces". Once the operator spaces, following the first word, the machine will accept subsequent inputs, except for additional spaces before the first character of the second word which are ignored.

Upon the completion of the second level search, the machine will refuse to accept character inputs until the operator spaces the writing apparatus 33 indicating the end of the second word. The machine 10 will ignore subsequent spaces until the first character of the third word is entered.

If the operator spaces after the first character of the first word is entered, the machine 10 recognizes this as indicating the end of the word and conducts a first level search for a program identified by the first character entered and two blanks. If the space occurs after the second character of the first word, the machine 10 searches for a program identified by the two characters entered, followed by a blank.

If the operator spaces following the first character of the second word, the machine will conduct a second level search for a program identified by the first character of the first word, the first character of the second word, and a blank.

Before any characters are entered in the translate mode, a "tab" command by the operator is ignored, as previously discussed. However, once the first character of the first word has been entered, a tab operation by the operator will indicate that the entire entry is to be terminated.

If the tab occurs after the first character of the first word has been entered, the machine 10 will search for a program identified by the first character and two blanks. If no program is found, the registers are reset and the error program is searched for.

If the tab occurs following the second character of the first word, the machine 10 searches for a program identified by the first two characters of the word and a blank. If unsuccessful, a search for the error program is then commenced.

If the tab occurs following the entry of the first three characters of the first word, the machine 10, after making the first level search for a program identified by the first three characters of the first word, then looks for a program identified by the first two characters and a blank. If such a program is not found, the registers are reset and a search for the error routine is initiated.

If the tab occurs following the first character of the second word, the machine 10 will reset the common register 78 and search for a program identified by the first character of the first word, the first character of the second word, and a blank. If no program is found identified by these characters, then the machine 10 will reset the three registers and search for the error routine.

If the tab occurs after the second character of the second word, the machine 10 searches, as usual, for a program identified by the first character of the first word, the first character of the second word, and the second character of the second word. If this search is unsuccessful, the three registers are reset and a search for the error routine is initiated.

If the tab occurs after the first character of the third word is entered, then the machine will search for a program identified by the first character of the first word, the first character of the second word, and the first character of the third word. If no such program is found, then the three registers are reset and a search for the error routine is initiated.

Once a particular program or instruction is located in this manner, it can be punched into a tape by means of the tape punch 35. In this manner an entirely new program or programs may be placed on a punched tape, after which the contents of the tape may be placed on the program delay line 74 for the use of an operator. Due to the use of English, or other language, descriptive or identifying works, the new program or program generated in this manner can be readily, economically and easily obtained. It should be noted, however, that the three character identification of each instruction or program is not punched into the tape. However, by means of the keyboard of the writing machine 33, each program thus generated on a punched tape may be identified by a single character, as described above in conjunction with the search mode, this identifying character being directly punched onto the tape from the keyboard 16 of the writing machine 33.

G. Programming Application

The present invention, when operated as a billing and accounting computer in the normal code of operation, provides the user with an extremely flexible and virtually automatic means of invoice preparation. To illustrate these features, a typical application of the invention will be discussed.

Figure 8:
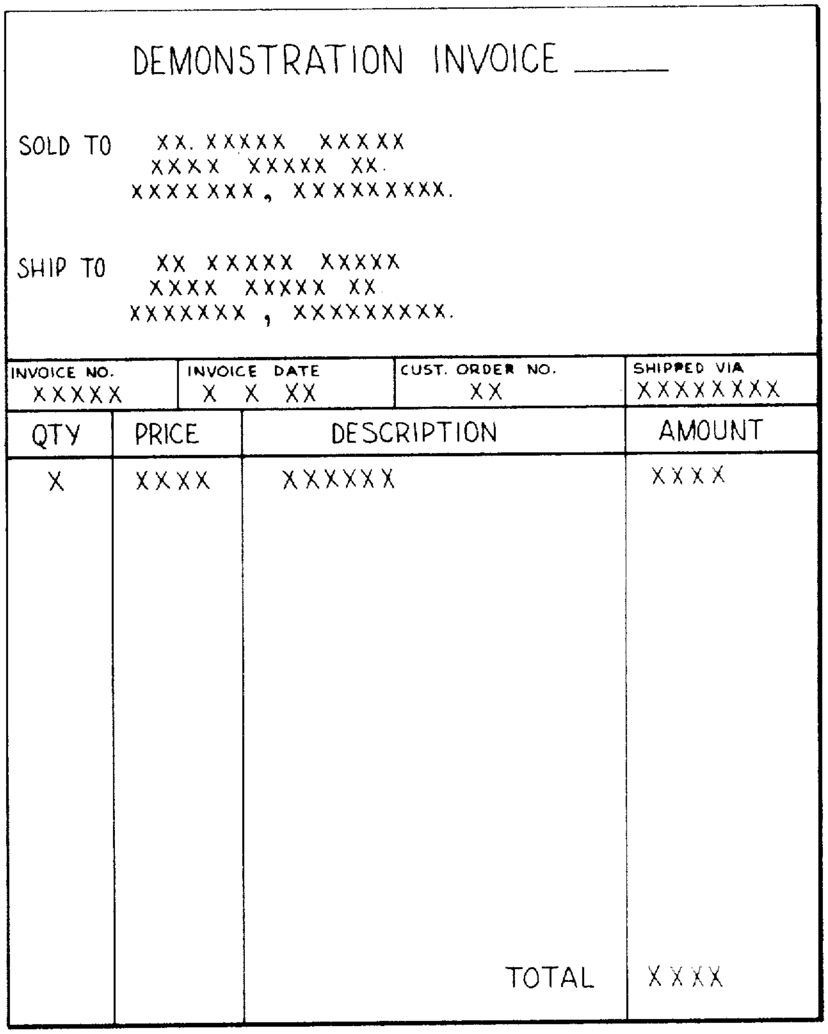
FIG. 8 is an illustration of an invoice used in conjunction with the present invention.

Assume a user of the invention sells merchandise and bills his customers with an invoice such as that illustrated in FIG. 8. Upon the receipt of a purchase order, a clerk will pull from the user's files a punched card (not shown) for that particular customer. This "header" card has the customer's name, address and all other pertinent data recorded on it, the clerk will then retrieve other punched cards (not shown) for each item ordered, which contain the items, price, description, etc.

To prepare the invoice, the user requires four separate programs. The first program is to be used at the beginning of each day immediately after the machine has been turned on and the programs on the program tape have been loaded onto the program data train. This program will be provided to prepare the data storage unit for the invoices to follow during the day and will contain certain instructions which will cause the machine to accept inputs by the operator corresponding to the last invoice number used the day before and the day's date. These entries will be stored into particular storage locations in the data storage unit and may be recalled for later use during the preparation of each invoice. This program is identified by a particular character and will be executed when the operator selects that character on the keyboard of the writing machine 33 (FIG. 1).

The second program is the heading program and will be used to control the printing of the heading on an invoice. When the proper identification character is selected, the program will cause the machine 10 to halt. Recall that when a halt instruction is executed, the machine 10 will remain in that status until a field switch on the writing machine 33 is activated. The halt instruction allows the operator to run the "-header" card through the reader 37. As the card is being read, the writing machine 33 reproduces data from the card on the invoice. In this case, the writing machine 33 would type the data for the "SOLD TO" and "SHIP TO" spaces on the invoice. The last code on the header card would be a "tab" code, causing the carriage 60 to move laterally, tripping the field switch 65. The machine 10, upon receipt of the signal, terminates the halt status and recommences computation. The program will cause the carriage 60 to be returned an appropriate number of times so that the INVOICE NO. location is correctly positioned. The blanks on this line will then be filled in by the machine 10, the invoice number is withdrawn from the data storage unit, typed out and then incremented by one for the next invoice. The machine 10 automatically tabs to the INVOICE DATA field, types out the date, and then halts to allow the operator to type in the CUSTOMER ORDER NO. and the SHIPPED VIA data. Once this information has been typed out on the form, the operator tabs the carriage 60, again tripping field switch 65. The program will cause the carriage 60 to carriage return a sufficient number of times to place the invoice in a position to type the data concerning the items ordered.

A third program is concerned with the item lines of the invoice to extend the price times quantity for the item and will be initiated by the operator for each line to be completed. The operator causes this program to be executed by selecting a correct identification character on the writing machine 33. The program immediately executes an "enter" instruction which allows the operator to enter the quantity of the item ordered. Once the correct number of digits have been entered, the machine 10 tabs to the PRICE field and causes the reader 37, which now contains the item card, to be turned on. As the item card is being automatically read, the writing machine 33 reproduces the price on the invoice and at the same time, the machine accepts the price as an input. The machine then tabs the carriage 60 to the DESCRIPTION field where the item's description is reproduced on the invoice from the item card. The machine then tabs to the AMOUNT field where the product of the quantity times price multiplication is typed out. The amount is then accumulated by the machine into a particular location in the data storage unit for use at a later time.

The fourth program positions the form for the total line and will print the totals at the base of each field. The program will be initiated by the operator selecting the proper character on the writing machine 33. The machine tabs to the DESCRIPTION field and types out the word TOTAL and then tabs to the appropriate column and recalls from storage the accumulated "amount," total printing it out also.

It is to be noted that during the preparation of the invoice, the operator's actions are minimal. By reducing the reliance placed upon an operator, the possible mistakes which can be made by an operator are accordingly reduced. Once the machine 10 has been initially programmed and set up with the appropriate tab stops, the operator need only correctly position the invoice and insert the cards in the proper sequence, that is, the header card followed by the item cards. As each card is inserted, the operator only selects one character on the writing machine 33 to cause the line for that item to be filled in. At the end of the invoice, the operator again selects one character to cause all appropriate totals to be typed out.

The foregoing discussion illustrates a very simple application of the present invention. The complexity of the action taken by the machine 10, when each card is processed, is limited only be the complexity of the particular program selected. For example, each item card might also contain data on the quantity of that item in the user's inventory and, as the card is read by reader 37 (FIG. 1), the selected program may subtract the quantity ordered from the quantity in inventory and cause this new amount to be punched on a new item card by punch 35. Therefore, at any time, the quantity in inventory of any item may be determined quite readily.

The present invention is not limited to billing and accounting applications, although it is expected that it will find its greatest use in this area. The invention may also be applied to solutions of any process capable of being reduced to basic arithmetic manipulations. Since the present invention might be thought of as replacing the operator at the keyboard of a desk top calculator, it is evident, therefore, that the capability of the invention to solve increasingly complex processes depends upon the capability of the arithmetic unit used in conjunction with it.

If the calculator's capability should include the square root function, it would be a simple matter for the present invention to be slightly modified such that a particular instruction character, when decoded in the operation register 82 (FIG. 4C), would cause the arithmetic unit to respond as though the square root key had been depressed.

If the number of keys that the calculator responds to is increased, the invention can be quite easily modified to provide characters corresponding to them. The adaptability of the present invention is, therefore, quite apparent.

The present invention, by storing individual programs sequentially upon a recirculating memory means and providing a program access means for causing a particular program on the memory means to be executed upon request, allows the construction of an inexpensive computer which is extremely flexible in application. Since each program on the memory means may provide the user with the capability of performing a particular process, the advantages of the invention over the present state-of-the-art machine, which requires the user to change memories for each process, is obvious.

The capability of the present invention to perform an unconditional branch instruction as previously described allows great programming flexibility as well as reducing the required memory space for a given program requirement. An instruction sequence which is common to two or more programs may be separated from the primary programs and by virtue of the unconditional branch instruction, be executed when required within a primary program, thus saving memory space and reducing cost.

The conditional branch instruction incorporated into the machine provides additional programming capability. The instruction, when executed, will cause the machine to branch to a particular resume instruction anywhere on the data train. This allows the programmer to jump instructions within a program, to reiterate instructions within a program, or to branch to an entirely new program, depending upon his requirements. The program control section comprising the present invention, by incorporating the features enumerated immediately above and others previously discussed, allows the programmer a great deal of flexibility when used in conjunction with the calculator, or arithmetic section, and an input/output device such as an automatic writing machine. The programmer may generate programs which, when executed by the machine, will cause interactions between the various input and output devices and the arithmetic section. Data received from the input devices may be entered into the arithmetic section, processed and printed or punched out on the output device under the control of the program control section. The machine may be adapted to process business requirements, such as generating billing or accounting statements, or to solve complex mathematical and scientific problems. This wide spectrum of capability is all provided by a machine whose cost, due to its program control section, is considerably less than the other known machines.

The translate feature of the present invention, a multiple-level search programs identified by a plurality of characters, increases the usefulness of the machine greatly by allowing the programmer to develop a program in the machine language without being overly familiar with the machine language itself. A knowledge of the machine language, of course, can be used to develop a program, but because the object codes (machine language characters) are designed to be interpreted by the machine, they are not readily understood by those unfamiliar with it. In addition, the problem of memorizing all the characters and their specific functions can be confusing and lend itself to a complication of the specific problem being solved. Recognizing these problems, software techniques have been developed within the computer industry which utilize "translator programs." These translator programs, often referred to as assemblers or compilers, interpret instructions written in a language common to the programmer and convert or translate them into the language of the machine. Following the same philosophy, the present invention includes a translate mode of operation. It is actually a part of the system of the machine 10, and because of the characteristics of the acoustic delay line method of storage, it offers one of the most versatile methods of writing translator programs yet developed in the industry and lends itself to the creation of any number of programming languages.

Figure 9:
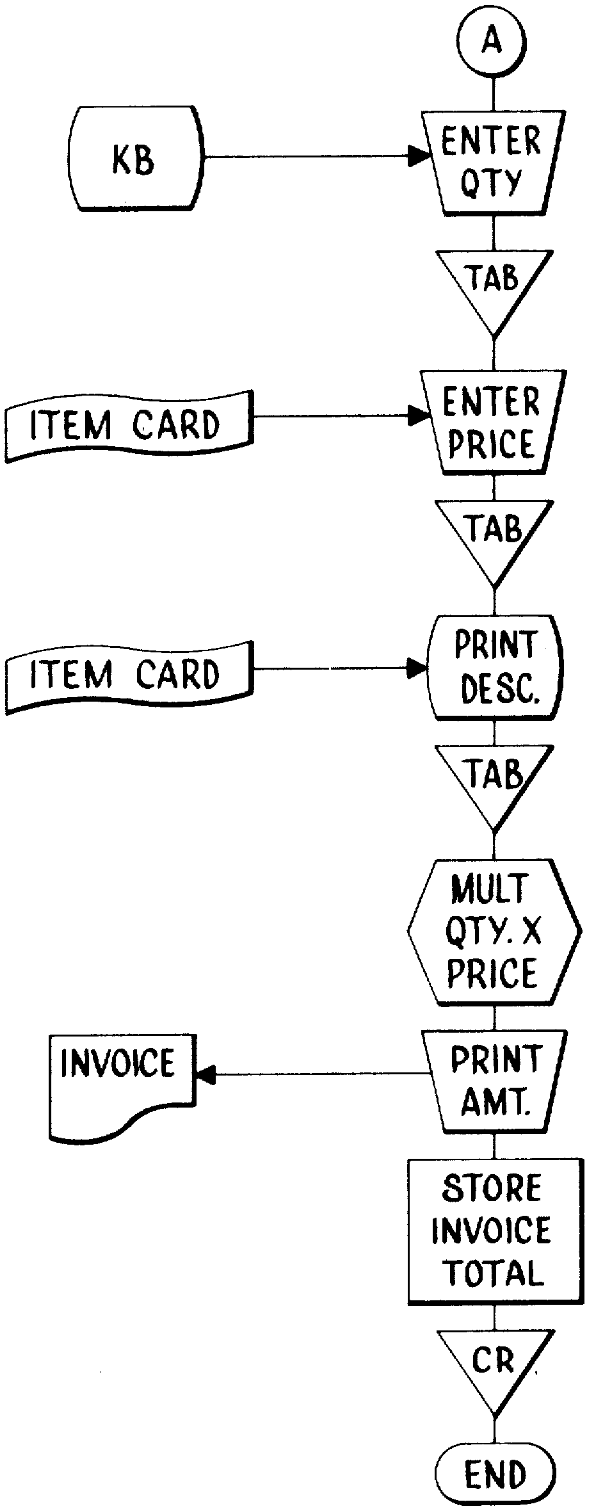
FIG. 9 is a block diagram of a program used by the present invention for the preparation of the invoice illustrated in FIG. 8.

To more specifically illustrate this feature, assume that a programmer wishes to develop a program corresponding to the line extension program discussed in connection with FIG. 8 for the entry of quantity, price, item description, and amount on the invoice. The programmer would develop a block diagram of the results he wishes to obtain similar to FIG. 9. The program would be identified as "sequence A" and the first action to be taken by the machine 10 when the operator selects the "A" character on the keyboard 16 of the writing machine 33, would be the entry of the quantity of the item ordered. The machine 10 will then tab to the price field where the price from the item card will be read into the machine and onto the invoice. The machine 10 then tabs to the description field and causes the reader 37 to reproduce the description from the item card onto the invoice. The quantity is then multiplied times price after the machine tabs to the amount field and prints out this value. The amount so calculated is then stored or accumulated with the running total for use later. The sequence ends with the carriage return to position the invoice for the next item.

Once the block diagram has been developed, the programmer converts the defined routines into the programming language.

Due to the nature of the present invention, the programming language consists of instructions in everyday English. The instructions "enter quantity," "enter price," etc., are meaningful commands to the machine 10 when the program line 74 contains the contents of a translate tape and is being operated in the translate mode of operation. When these words are entered into the machine 10, the program control section extracts the first three letters of the first word and searches for a program on the program data train identified by these characters. If no such program is found, the machine 10 then accepts the first two letters of the second word and searches for a program identified by the first letter of the first word and the first two letters of the second word. If again no program is recognized, the machine 10 will accept the first letter of the third word and search for a program identified by the first letter of the first word, the first letter of the second word, and the first letter of the third word.

If, during any of these searches, the machine 10 finds a program identified by these letters, it will commence to execute it. The program will contain instructions which will cause the tape punch 35 to punch particular characters onto a tape. The characters punched are instructions in the machine language. Once all the program language instructions have been typed into the machine 10 and the translate tape has caused a corresponding machine language tape to be punched out, the machine language tape may be entered into the program delay line 74 of the machine. The machine then operating in the normal mode will execute the sequence of instructions in machine language when that sequence is selected, and will cause the action defined originally in the programming language to be taken.

For example, the program language instruction "tabulate to price field" of FIG. 10, when typed into the machine during the translate mode, will cause the machine to make a first search for a program identified by the letters "TAB". The translate tape will have a program identified by these letters. The first instruction in this program would be to turn the tape punch 35 on, the next instruction would be a "type out" instruction with an address having bits in the 2, 3, 4 and 6 dispositions, this character corresponding to a tab character. When the "type out" instruction is executed, the address character would be typed out and, since the punch 35 is on, the character would also be punched.

This is a much simplified example of the translate feature but serves to illustrate the power that the feature gives to the machine. The action taken by the machine, once a program has been selected, depends, of course, upon the instructions in the program.

The ability to type the English language instructions, and have the equivalent machine language instruction punched out, provides versatility for the machine's user. Again, this is due to the manner in which the machine stores programs and instructions in the recirculating program data train which may be executed or stored on a punched tape upon request by various character inputs.

It should be repeated at this point that the use of the translate feature of the present invention is universal and not restricted to the English language. The descriptive word used to generate a machine language program may be in any language. The translate feature may be adapted to any foreign language by changing the keyboard 16 of the automatic writing machine 33 to the foreign language and entering a translate tape into the machine incorporating this language to identify the programs. In this manner, universality of the feature is achieved.

Changes may be made in the combination and arrangement of parts or elements as heretofore set forth in the specification and shown in the drawings, it being understood that changes may be made in the embodiments disclosed without departing from the spirit and scope of the invention as defined in the following claims.

What is claimed is:

1. Program apparatus for a computer comprising:

a memory for providing a recirculating path for a serial data train having a plurality of multibit characters, predetermined ones of said characters defining program instructions, said serial data train including at least one program having a plurality of said characters which includes at least one of said instruction characters, the first character of each said program being a program separator character, at least the second character of each said program being a program identification character, at least one of the remaining characters of each said program being an instruction character, a first register for selecting predetermined ones of said programs, input means for entering a program request character into said register which request character is identical to the program identification character of a selected program, a first decoder coupled to said first register for providing a first signal indicative of a program request character in said first register, a second register coupled to said recirculating path for receiving successive ones of said characters as they recirculate, a second decoder coupled to said second register for providing a second signal indicative of the occurrence of a separator character in said second register in response to the occurrence of said first signal, and comparing means coupled to said first register and said recirculation path and enabled by the occurrence of said second signal for comparing the program request character in said first register with the program identification character that follows said separator character and generating a compare signal when they are the same.

2. Apparatus according to claim 1 further including:

output means responsive to said compare signal for producing a record of the selected program.

3. Apparatus according to claim 1 wherein there is further included:

a third register responsive to said compare signal for having an instruction marker set therein and also responsive to said compare signal for recirculating the data train therethrough such that said instruction marker is inserted in said data train following the program identifying character of the program to be executed.

4. Apparatus according to claim 3 further including:

a third decoder coupled to said third register for providing a third signal indicative of the occurrence of said instruction marker in said third register, said second register enabled by the occurrence of said third signal for causing said data train to be received by said second register and not said third register for one character time and then reverting to again recirculating said data train through said third register such that said instruction marker is located on said data train following the character copied into said second register during said one character time and the character copied in said second register is located on said data train in the space formerly occupied by said instruction marker.

5. The apparatus according to claim 1 wherein:

said comparing means includes a bistable device which is in one stable state when the program request character in the first register corresponds to the program-identifying character following a separator character and in its other stable state when the program request character in the first register differs from the program-identifying character following a separator character.

6. Apparatus according to claim 1 further including:

means coupled to said recirculating data path and responsive to the occurrence of said compare signal for executing the instructions of the program identified by the program request character in said first register.

7. Apparatus according to claim 6 further including:

a third register responsive to said compare signal for having an instruction marker set therein and responsive to said compare signal for having the data train recirculated therethrough, and a third decoder coupled to said third register for providing a third signal indicative of the occurrence of said instruction marker in said third register, said third register responsive to said third signal for disabling circulation of the data train therethrough for a predetermined time interval, said second register responsive to said third signal for enabling said second register to receive said data train characters for a predetermined time interval such that said instruction marker is placed on said data train behind each instruction character as each instruction character is executed.

8. Apparatus according to claim 7 wherein said mans for executing program instructions is coupled to said second register.

9. Apparatus according to claim 6 wherein:

at least one character in at least one program comprises a resume character, at least one character in at least one program comprises a branch character, said second decoder responsive to a branch character in said second register for producing a branch signal;

said means for executing instructions responsive to the occurrence of said branch signal for disabling executing of instructions until a resume character occurs in said second register.

10. In an apparatus according to claim 6 wherein:

at least one character in at least one program comprises a branch character, each said branch character being followed by a program request character, each said program request character identifying a predetermined program sequence, said second decoder being responsive to the occurrence of a branch character in said second register for producing a branch signal, said means for executing program instructions responsive to branch signal for disabling the execution of instructions until the program sequence defined by said program request character occurs in said data train.

11. Program-handling apparatus comprising:

a memory for recirculating a data train of pulses divided into characters, predetermined ones of said characters defining program instructions, groups of at least some of said characters defining a program, at least one character preceding a program-defining group of characters or instruction character being a separator character, and at least two characters subsequent to said separator character but preceding said program defining characters or instruction character being program identification characters;

a plurality of registers equal in number to said program identification characters;

input means coupled to said registers for entering from a source outside of said memory, successive ones of a plurality of program request characters equal in number to said registers into successive ones of said registers;

compare means coupled to at least one of said registers and to said recirculating data path and responsive to entry of program request characters into said registers for comparing the program request characters in said registers with the program identification characters following said separators for generating a compare signal when the contents of said registers are the same as said program identification characters.

12. The apparatus according to claim 11 wherein:

the input means includes a manually operated keyboard.

13. The apparatus of claim 11 wherein:

the input means enables substitution of at least one new input character into one of the said registers if no compare signal was generated during an entire recirculation cycle of the data train after entry of characters into said registers.

14. The apparatus of claim 11 further including:

means coupled to at least one of said registers for setting a predetermined error-indicating character in at least one of said registers if no compare signal was generated by the compare means.

15. The apparatus of claim 11 further including:

output means responsive to the compare signal for producing a record of the identified instruction or program.

16. Program apparatus for a computer comprising:

a memory for providing a recirculating path for a serial data train having a plurality of multibit characters, predetermined ones of said characters defining program instructions, said serial data train including at least one program having a plurality of said characters which includes at least one of said instruction characters, at least one of the characters of each said program being a program identification character, at least some of the remaining characters of each said program being instruction characters, a register for selecting predetermined ones of said programs, input means for entering a program request character into said register which request character is identical to the program identification character of a selected program, a decoder coupled to said register for providing a signal indicative of a program request character in said first register, comparing means coupled to said register and said recirculating path and enabled by the occurrence of said signal for comparing the program request character in said register with the program identification characters in said data train and generating a compare signal when they are the same.

* * * * *